US008545309B2

(12) United States Patent
Walker et al.

(10) Patent No.: US 8,545,309 B2
(45) Date of Patent: Oct. 1, 2013

(54) GAMING SYSTEMS AND APPARATUS FOR DETECTING A SIGNAL INDICATIVE OF A PROBLEM GAMBLER AND DISPATCHING AN EVENT IN RESPONSE THERETO

(75) Inventors: Jay S. Walker, Ridgefield, CT (US); James A. Jorasch, Westport, CT (US); Magdalena M. Fincham, Ridgefield, CT (US)

(73) Assignee: IGT, Reno, NV (US)

( * ) Notice: Subject to any disclaimer, the term of this patent is extended or adjusted under 35 U.S.C. 154(b) by 1373 days.

(21) Appl. No.: 11/814,546

(22) PCT Filed: Dec. 2, 2005

(86) PCT No.: PCT/US2005/043595
§ 371 (c)(1), (2), (4) Date: Jul. 23, 2007

(87) PCT Pub. No.: WO2007/064327
PCT Pub. Date: Jun. 7, 2007

(65) Prior Publication Data
US 2008/0090645 A1 Apr. 17, 2008

(51) Int. Cl.
*A63F 13/00* (2006.01)

(52) U.S. Cl.
USPC .................... 463/25; 463/16; 463/21; 463/47

(58) Field of Classification Search
USPC .......................................... 463/21, 25, 47, 16
See application file for complete search history.

(56) References Cited

U.S. PATENT DOCUMENTS

| | | | |
|---|---|---|---|
| 3,697,698 | A | 10/1972 | Oswald et al. |
| 4,760,245 | A | 7/1988 | Fukaya |
| 4,882,473 | A | 11/1989 | Bergeron et al. |
| 5,132,900 | A | 7/1992 | Gilchrist et al. |
| 5,178,390 | A | 1/1993 | Okada |
| 5,259,613 | A | 11/1993 | Marnell, II |
| 5,429,361 | A | 7/1995 | Raven et al. |
| 5,459,825 | A | 10/1995 | Anderson et al. |
| 5,553,221 | A | 9/1996 | Reimer et al. |
| 5,561,811 | A | 10/1996 | Bier |
| 5,634,849 | A | 6/1997 | Abecassis |
| 5,655,961 | A | 8/1997 | Acres et al. |

(Continued)

FOREIGN PATENT DOCUMENTS

| | | |
|---|---|---|
| WO | WO 01/25957 A2 | 4/2001 |
| WO | WO 2004/036505 | 4/2004 |
| WO | WO 2005/022453 | 3/2005 |
| WO | WO 2005/098650 | 10/2005 |

OTHER PUBLICATIONS

Australian Patent Office Search Report for Singapore Patent Application No. SG 200508079-1 mailed Apr. 7, 2006, 4 pp.

(Continued)

*Primary Examiner* — Pierre Eddy Elisca
*Assistant Examiner* — Shahid Kamal
(74) *Attorney, Agent, or Firm* — Fincham Downs, LLC; Magdalena M. Fincham

(57) ABSTRACT

In accordance with one or more embodiments, an apparatus and system is provided for determining whether a player requires attention as a problem gambler. The apparatus and system are further operable to dispatch an event, the event for interacting with the problem gambler. The interaction may be targeted, for example, at curbing a player's inappropriate or potentially problematic gambling behavior.

14 Claims, 14 Drawing Sheets

(56) References Cited

U.S. PATENT DOCUMENTS

| | | | | |
|---|---|---|---|---|
| 5,661,517 | A | 8/1997 | Budow et al. | |
| 5,717,923 | A | 2/1998 | Dedrick | |
| 5,734,719 | A | 3/1998 | Tsevedos et al. | |
| 5,735,742 | A | 4/1998 | French | |
| 5,761,647 | A | 6/1998 | Boushy | |
| 5,772,509 | A | 6/1998 | Weiss | |
| 5,800,269 | A | 9/1998 | Holch et al. | |
| 5,816,918 | A | 10/1998 | Kelly et al. | |
| 5,859,416 | A | 1/1999 | Gatto | |
| 5,861,906 | A | 1/1999 | Dunn et al. | |
| 5,902,983 | A | 5/1999 | Crevelt et al. | |
| 5,949,411 | A | 9/1999 | Doerr et al. | |
| 5,971,271 | A | 10/1999 | Wynn et al. | |
| 5,999,198 | A | 12/1999 | Horan et al. | |
| 6,007,426 | A | 12/1999 | Kelly et al. | |
| 6,009,410 | A | 12/1999 | LeMole et al. | |
| 6,009,458 | A | 12/1999 | Hawkins et al. | |
| 6,029,046 | A | 2/2000 | Khan et al. | |
| 6,029,195 | A | 2/2000 | Herz | |
| 6,049,823 | A | 4/2000 | Hwang | |
| 6,068,552 | A | 5/2000 | Walker et al. | |
| 6,089,982 | A | 7/2000 | Holch et al. | |
| 6,128,663 | A | 10/2000 | Douglass | |
| 6,131,086 | A | 10/2000 | Walker et al. | |
| 6,165,069 | A | 12/2000 | Sines et al. | |
| 6,168,522 | B1 | 1/2001 | Walker et al. | |
| 6,174,234 | B1 | 1/2001 | Seibert | |
| 6,219,836 | B1 | 4/2001 | Wells et al. | |
| 6,244,958 | B1 | 6/2001 | Acres | |
| 6,280,328 | B1 | 8/2001 | Holch et al. | |
| 6,306,038 | B1 | 10/2001 | Graves | |
| 6,312,333 | B1 | 11/2001 | Acres | |
| 6,330,595 | B1 | 12/2001 | Ullman et al. | |
| 6,350,199 | B1 | 2/2002 | Williams et al. | |
| 6,358,150 | B1 | 3/2002 | Mir et al. | |
| 6,374,287 | B1 | 4/2002 | Goldstein | |
| 6,379,246 | B1 | 4/2002 | Dabrowski | |
| 6,445,874 | B1 | 9/2002 | Catlow | |
| 6,464,583 | B1 | 10/2002 | Kidron | |
| 6,508,710 | B1 | 1/2003 | Paravia et al. | |
| 6,516,997 | B1 | 2/2003 | Tanazawa et al. | |
| 6,532,448 | B1 | 3/2003 | Higginson et al. | |
| 6,533,663 | B1 | 3/2003 | Iwao et al. | |
| 6,537,151 | B1 | 3/2003 | Walker et al. | |
| 6,554,705 | B1 | 4/2003 | Cumbers | |
| 6,554,707 | B1 | 4/2003 | Sinclair et al. | |
| 6,606,602 | B1 | 8/2003 | Kolls | |
| 6,629,890 | B2 | 10/2003 | Johnson | |
| 6,645,077 | B2 | 11/2003 | Rowe | |
| 6,712,698 | B2 | 3/2004 | Paulsen et al. | |
| 6,719,631 | B1 | 4/2004 | Tulley et al. | |
| 6,769,991 | B2 | 8/2004 | Fields | |
| 6,908,385 | B2 | 6/2005 | Green | |
| 6,945,457 | B1 | 9/2005 | Barcelou | |
| 6,980,962 | B1 | 12/2005 | Arganbright et al. | |
| 7,022,017 | B1 | 4/2006 | Halbritter et al. | |
| 7,210,998 | B2 | 5/2007 | Kazaoka et | |
| 7,229,354 | B2 | 6/2007 | McNutt et al. | |
| 7,258,610 | B2 * | 8/2007 | Seelig et al. | 463/20 |
| 7,326,116 | B2 | 2/2008 | O'Donovan et al. | |
| 7,351,145 | B1 | 4/2008 | Ornstein et al. | |
| 2001/0031663 | A1 | 10/2001 | Johnson | |
| 2001/0040341 | A1 | 11/2001 | Kamille | |
| 2002/0019253 | A1 | 2/2002 | Reitzen et al. | |
| 2002/0094869 | A1 | 7/2002 | Harkham | |
| 2002/0138461 | A1 | 9/2002 | Sinclair et al. | |
| 2002/0142824 | A1 | 10/2002 | Kazaoka et al. | |
| 2002/0142825 | A1 | 10/2002 | Lark et al. | |
| 2002/0142846 | A1 | 10/2002 | Paulsen | |
| 2002/0166126 | A1 | 11/2002 | Pugh et al. | |
| 2003/0022719 | A1 | 1/2003 | Donald et al. | |
| 2003/0091158 | A1 | 5/2003 | Puchek et al. | |
| 2003/0114217 | A1 | 6/2003 | Walker et al. | |
| 2003/0190944 | A1 * | 10/2003 | Manfredi et al. | 463/20 |
| 2004/0106449 | A1 | 6/2004 | Walker et al. | |
| 2004/0242319 | A1 | 12/2004 | Walker et al. | |
| 2004/0266517 | A1 * | 12/2004 | Bleich et al. | 463/20 |
| 2005/0107163 | A1 * | 5/2005 | Nguyen et al. | 463/42 |
| 2007/0099708 | A1 * | 5/2007 | Okada | 463/46 |
| 2008/0188288 | A1 * | 8/2008 | Seelig et al. | 463/20 |
| 2009/0149245 | A1 * | 6/2009 | Fabbri | 463/25 |
| 2010/0062834 | A1 * | 3/2010 | Ryan | 463/25 |
| 2010/0093428 | A1 * | 4/2010 | Mattice et al. | 463/25 |

OTHER PUBLICATIONS

Written Opinion for PCT Patent Application No. PCT/US/05/43595 mailed Apr. 26, 2006, 6 pp.

International Search Report for PCT Patent Application No. PCT/US/05/43595 mailed Apr. 26, 2006, 2 pp.

Martinez, Ruben, Managing Casinos, Barricade Books, Copyright, 1995, 16 pp.

Communication dated Sep. 26, 2011 from Application No. 2007240477 from the Australian Patent Office, 1 pg.

Gambling Regulation Act 2003 (Victoria)—SECT 10.6.1—Ministerial directions as to requirements of self-exclusion programs, 2 pp. ---.

Gaming Control Act 1993 (Tasmania)—SECT 76ZNC—Third party exclusion from wagering with licensed provider, 2 pp.

National Association for Gambling Studies (Australia) 2003 Conference proceedings—Sessional Papers—Legal Liability for self-exclusion-R. Brading, 294 pp.

Australian Patent Office Search Report for Application No. SG 200603582-8, dated Jun. 4, 2007, 4 pp.

"Revealing the Casinos Best-Kept Secrets", Atlantic City Insider, Oct. 1996, vol. 1, No. 2, 5 pp.

Office Action for U.S. Appl. No. 11/408,288, mailed May 14, 2008, 12 pp.

Website: "Boarding Pass Registration", Station Casino, (http //myboardingpass com/bpass/signup asp), download date: Apr. 20, 2001, 2 pp.

Website: "eTickets", Admission Control.com, (http //www admissioncontrol com/acc/aboutetickets htm), download date: Apr. 20, 2001, 4 pp.

Website: "MyBoardingPass.com One Card Does It All in Las Vegas!", Station Casino, (http //myboardingpass com/bpass/main asp), download date: Apr. 20, 2001, 1 pg.

Website: "Station Casinos Entertainment", Station Casino, (http //myboardingpass com/home/default asp?f=1), download date: Apr. 20, 2001, 1 pg.

Website: "Kool Kat™", IGT, (http //www igtonline com/garnes/new_games/kool html), download date: Apr. 23, 2001, 1 pg.

Website: "Silicon Gaming Hopes 'Feud' Yields Fortune", Gaming Magazine, (http //gamingmagazine com/managearticle asp?c=290&a=251), download date: Apr. 23, 2001, 2 pp.

Website: "Bob Dancer presents WinPoker", (http //conjelco com/software html), download date Sep. 7, 2001, 1 pg.

Website: "Speedpass: Sign Up FREE!", (https //www speedpass com/care/signup jsp), download date: Oct. 9, 2001, 1 pg.

Yonaites, Gary, "Wild Icons . . . The Custom Slot Machine", Wild Icons™ Version 1.0.0, (http //www yonaites com/Wild_Icons/), download date: Dec. 4, 2001, 3 pp.

Kahney, Leander, "IPhoto Completes Apple's Picture", Wired News, (http //www wired com/news/print/0,1294,49552,00 html), download date: Jan. 8, 2002, 3 pp.

Benston, Liz "Cesears Responsible Gaming", Las Vegas Sun, Dec. 1, 2005, 3 pp.

Office Action for U.S. Appl. No. 10/121,263, mailed Mar. 23, 2005, 9 pp.

Search Report for PCT Application No. PCT/US06/23522, mailed May 1, 2008 4 pp.

Written Opinion for PCT Application No. PCT/US06/23522, mailed May 1, 2008, 12 pp.

Written Opinion for PCT Application No. PCT/US05/043595, mailed Apr. 26, 2006, 8 pp.

Office Action for U.S. Appl. No. 11/498,288, mailed Nov. 24, 2008, 14 pp.

Office Action for U.S. Appl. No. 11/498,288, mailed Jul. 22, 2009, 14 pp.

Office Action for U.S. Appl. No. 12/511,656, mailed Dec. 7, 2010, 19 pp.
Office Action for U.S. Appl. No. 12/511,656, mailed May 12, 2010, 14 pp.
Office Action for U.S. Appl. No. 11/814,546, mailed Nov. 9, 2010, 15 pp.
Notice of Allowance for U.S. Appl. No. 11/422,756, mailed Jul. 29, 2010, 5 pp.
Notice of Allowance for U.S. Appl. No. 11/422,756, mailed Apr. 28, 2010, 9 pp.
Office Action for U.S. Appl. No. 11/422,756, mailed Dec. 15, 2009, 6 pp.
Notice of Allowance for U.S. Appl. No. 10/121,263, mailed Jan. 18, 2006, 4 pp.
Office Action for U.S. Appl. No. 10/121,263, mailed Sep. 21, 2005, 11 pp.
Office Action for U.S. Appl. No. 11/406,130, mailed Aug. 30, 2010, 14 pp.
Office Action for U.S. Appl. No. 11/406,130, mailed Mar. 10, 2009, 16 pp.
Office Action for U.S. Appl. No. 11/406,130, mailed Aug. 20, 2008, 19 pp.
Office Action for U.S. Appl. No. 11/406,130, mailed Feb. 12, 2008, 15 pp.
Office Action for U.S. Appl. No. 11/427,581, mailed Feb. 28, 2008, 15 pp.
Examiner's Answer for U.S. Appl. No. 11/408,288 dated Jul. 26, 2011, 23 pp.
International Search Report for PCT Application No. PCT/US02/11798 mailed Jul. 15, 2002, 1 pg.
International Search Report for PCT Application No. PCT/US05/43595, mailed Apr. 26, 2006, 2 pp.

* cited by examiner

400

| | PLAYER IDENTIFIER 405 | NAME 410 | ADDRESS 415 | PLAYER SINCE 420 | TOTAL WAGERED 425 |
|---|---|---|---|---|---|
| R400-1 | P-000001 | BOB JONES | 15 ELM ST. SPRINGTOWN, NY | 11/20/99 | $1,535.00 |
| R400-2 | P-000002 | MARIA LOPEZ | 35 GUMDROP DR. CAPITAL CITY, CA | 7/28/04 | $168.50 |
| | ⋮ | | ⋮ | | ⋮ |
| R400-3 | P-106998 | CHARLES WILLIAMS | 140 MAIN ST. PRAIRIEVILLE, ND | 1/15/93 | $19,754.25 |
| R400-4 | P-106999 | KLYE SMITH | 65 BEACH LN. # 1 BEACH CITY, NJ | 3/26/98 | $980.10 |

FIG. 4A 400 (CONT.)

| | THEORETICAL WIN 425 | PROBLEM GAMBLER? 430 | PROBLEM GAMBLER SCORE 435 |
|---|---|---|---|
| R400-1 | $138.15 | YES | 325 |
| R400-2 | $15.17 | - | - |
| ⋮ | | ⋮ | |
| R400-3 | $1,777.88 | NO | 72 |
| R400-4 | $88.21 | POTENTIAL | 195 |

FIG. 4B

| PROBLEM GAMBLER IDENTIFIER 505 | DATE IDENTIFIED 510 | DISPATCHED EVENTS 515 | | CURRENT STATUS 520 |
|---|---|---|---|---|
| P-000001 | 03/03/2005 | 03/03/2005 | EMPLOYEE PASSIVE INTERVENTION | PREVENT WAGERS ≥ $1.00 |
| | | 03/29/2005 | QUESTIONNAIRE AND GAMBLERS ANONYMOUS INFO. OUTPUT | |
| | | 05/01/2005 | EMPLOYEE AGGRESSIVE INTERVENTION | |
|  SMITH, NORA | 06/12/2005 | 06/12/2005 | EMPLOYEE PASSIVE INTERVENTION | CONTINUE LOW-GRADE INTER-VENTION |

600

| | DISPATCHED EVENT IDENTIFIER 605 | EVENT DESCRIPTION 610 | TIME OF DISPATCH 615 |
|---|---|---|---|
| R600-1 | DE-101327910 | EMPLOYEE 6031120 APPROACH PLAYER - PASSIVE INTERVENTION | 07/01/2005 3:22 PM |
| R600-2 | DE-101327911 | EMPLOYEE 7031240 APPROACH PLAYER - AGGRESSIVE INTERVENTION | 07/01/2005 4:17 PM |
| R600-3 | DE-101327912 | OUTPUT MESSAGE M402-11 | 07/01/2005 4:18 PM |
| R600-4 | DE-101327913 | INTERRUPT PLAY ON GAMING DEVICE GD-102410-32 | 07/01/2005 4:22 PM |

FIG. 6A 600 (CONT.)

| TIME OF COMPLETION 620 | PLAYER IDENTIFIER 625 | FEEDBACK 630 | |
|---|---|---|---|
| 07/01/2005 3:28 PM | P-791021 | PLAYER FRIENDLY, TOOK A BREAK | R600-1 |
| IN PROGRESS | P-092418 | - | R600-2 |
| 07/01/2005 4:19 PM | P-000433 | PLAYER COMPLETED QUESTIONNAIRE | R600-3 |
| 07/01/2005 4:22 PM | P-905777 | PLAYER LOGGED COMPLAINT, LEFT CASINO | R600-4 |

FIG. 6B

700

| EVENT IDENTIFIER 705 | EVENT DESCRIPTION 710 | EVENT LEVEL 715 | OUTPUT RULE 720 |
|---|---|---|---|
| E-3210 | DISPATCH EMPLOYEE TO OBSERVE PLAYER | 1 | 150 ≥ PROBLEM GAMBLER SCORE ≥ 100 |
| E-5031 | DISPATCH EMPLOYEE TO TALK TO PLAYER ABOUT ISSUES UNRELATED TO PROBLEM GAMBLING | 1 | 175 ≥ PROBLEM GAMBLER SCORE ≥ 151 |
| E-3207 | DISPATCH EMPLOYEE TO TALK TO PLAYER ABOUT ISSUES RELATED TO PROBLEM GAMBLING | 2 | 225 ≥ PROBLEM GAMBLER SCORE ≥ 176 |
| E-7031 | OUTPUT PROBLEM GAMBLER QUESTIONNAIRE | 2 | 275 ≥ PROBLEM GAMBLER SCORE ≥ 226 |
| E-6041 | INTERRUPT PLAY OF GAMING DEVICE | 3 | PROBLEM GAMBLER SCORE ≥ 276 |

FIG. 7

GAMING SYSTEMS AND APPARATUS FOR DETECTING A SIGNAL INDICATIVE OF A PROBLEM GAMBLER AND DISPATCHING AN EVENT IN RESPONSE THERETO

The present application claims the benefit of priority of PCT/US05/43595, filed Dec. 2, 2005, entitled "GAMING SYSTEMS AND APPARATUS FOR DETECTING A SIGNAL INDICATIVE OF A PROBLEM GAMBLER AND DISPATCHING AN EVENT IN RESPONSE THERETO".

FIELD

This invention relates to gaming devices and systems, especially ones operable to facilitate a wagering game and detect a signal from a player playing the wagering game.

BACKGROUND

Gambling is a fun activity that is entertaining for players and profitable for casinos. If participated in on a healthy basis, it can provide hours of enjoyment to a player, as well as serve as a healthy outlet for emotions and leisure time. However, some players may have a problem with gambling, to the extent that they spend money they cannot afford on wagering games. It would be advantageous, both to players and to casinos, to detect such problem gamblers and intervene with them during their gambling activities. It would benefit casinos to help ensure that their players participate in the entertainment available to them in an appropriate manner. It would benefit players who have a problem with gambling to have their problem gambling identified, tracked and/or interrupted, thus reducing the likelihood of them getting carried away with an activity that is being conducted in a manner inappropriate for them. It would be advantageous to have a gaming apparatus and/or system operable to detect a problem gambler and to dispatch an event.

SUMMARY

In accordance with one or more embodiments, a gaming device is provided. The gaming device comprises a display device for displaying game information to a player, as well as an input device usable by a player to provide an input to the gaming device. The gaming device further comprises a processor operable to facilitate a wagering game and a memory storing a program for directing the processor. The processor and the program are operable to determine that a player has provided an input to the gaming device and to determine that the input is an indication that the player may require attention as a problem gambler. The processor and the program are further operable to transmit an indication to a server device, the indication indicating the input from the player. In one embodiment, the processor and the program are operable to, based on the determination that the player may require attention as a problem gambler, interrupt play of the gaming device by the player and/or output a message to the player.

In accordance with one or more embodiments, a gaming system is provided. The gaming system comprises a gaming device having a display device for displaying game information to a player and an input device operable by the player to provide an input to the gaming device. The gaming system further comprises a server device in communication with the gaming device. The gaming device is operable to determine that a player has provided an input to the gaming device using the input device. The gaming device is further operable to transmit an indication of the input to the server device. The server device is operable to determine, based on the input, that the player may require attention as a problem gambler and to dispatch an event in response to the determination. Dispatching the event may comprise, for example, one or more of (i) transmitting an instruction to a casino employee to approach the player; (ii) creating a record in a database; (iii) scoring the indication; (iv) directing a video camera to focus on the player; (v) outputting a message to the player; and (vi) interrupting play of the gaming device by the player.

In accordance with one or more embodiments, a server operable to facilitate wagering at a wagering establishment is provided. The server comprises a processor and a memory storing a program for directing the processor. The processor and the memory are operable together to (i) receive an indication from a gaming device, the signal indicative of an input provided by a player to the gaming device; (ii) determine, based on the indication, that the player may require attention as a problem gambler; and (iii) dispatch an event in response to the determination. Dispatching the event may comprise, for example, one or more of (i) transmitting an instruction to a casino employee to approach the player; (ii) creating a record in a database; (iii) scoring the indication; (iv) directing a video camera to focus on the player; (v) outputting a message to the player; and (vi) interrupting play of the gaming device by the player.

BRIEF DESCRIPTION OF THE FIGURES

Various embodiments of the present invention are described herein with reference to the accompanying drawings. In the drawings, like reference numerals indicate identical or functionally similar elements. The leftmost digit(s) of a reference numeral typically identifies the figure in which the reference numeral first appears. As will be understood by those skilled in the art, the drawings and accompanying descriptions presented herein indicate some exemplary arrangements for stored representations of information. A number of other arrangements may be employed besides the tables shown. Similarly, the illustrated entries represent exemplary information, but those skilled in the art will understand that the number and content of the entries can be different from those illustrated herein. A brief description of the drawings follows.

FIGS. 4A and 4B are a table illustrating an example structure and example data for a player database in accordance with at least one embodiment.

FIGS. 6A and 6B are a table illustrating an exemplary structure and exemplary data for a dispatched events database in accordance with one or more embodiments.

FIG. 7 is a table illustrating an exemplary structure and exemplary data for an available event types database in accordance with one or more embodiments.

DETAILED DESCRIPTION

Figure 1A:
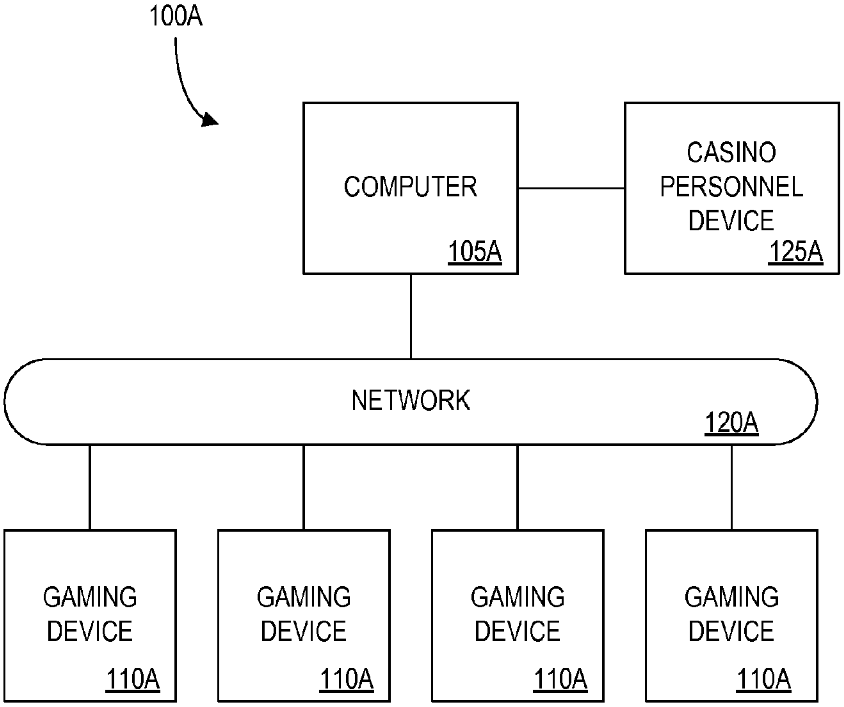
FIG. 1A is a block diagram of an example embodiment of a system, in accordance with at least one embodiment.

Numerous embodiments are described in this patent application, and are presented for illustrative purposes only. The described embodiments are not intended to be limiting in any sense. The invention is widely applicable to numerous embodiments, as is readily apparent from the disclosure herein. These embodiments are described in sufficient detail to enable those skilled in the art to practice the invention, and it is to be understood that other embodiments may be utilized and that structural, logical, software, electrical and other changes may be made without departing from the scope of the present invention. Accordingly, those skilled in the art will recognize that the present invention may be practiced with various modifications and alterations. Although particular features of the present invention may be described with reference to one or more particular embodiments or figures that form a part of the present disclosure, and in which are shown, by way of illustration, specific embodiments of the invention, it should be understood that such features are not limited to usage in the one or more particular embodiments or figures with reference to which they are described. The present disclosure is thus neither a literal description of all embodiments of the invention nor a listing of features of the invention that must be present in all embodiments.

The terms “an embodiment”, “embodiment”, “embodiments”, “the embodiment”, “the embodiments”, “an embodiment”, “some embodiments”, “an example embodiment”, “at least one embodiment”, “one or more embodiments” and “one embodiment” mean “one or more (but not necessarily all) embodiments of the present invention(s)” unless expressly specified otherwise.

The terms “including”, “comprising” and variations thereof mean “including but not limited to”, unless expressly specified otherwise.

The term “consisting of” and variations thereof mean “including and limited to”, unless expressly specified otherwise.

The enumerated listing of items does not imply that any or all of the items are mutually exclusive. The enumerated listing of items does not imply that any or all of the items are collectively exhaustive of anything, unless expressly specified otherwise. The enumerated listing of items does not imply that the items are ordered in any manner according to the order in which they are enumerated.

The terms “a”, “an” and “the” mean “one or more”, unless expressly specified otherwise.

The term “based on” means “based at least on”, unless expressly specified otherwise.

The methods described herein (regardless of whether they are referred to as methods, processes, algorithms, calculations, and the like) inherently include one or more steps. Therefore, all references to a “step” or “steps” of such a method have antecedent basis in the mere recitation of the term ‘method’ or a like term. Accordingly, any reference in a claim to a ‘step’ or ‘steps’ of a method is deemed to have sufficient antecedent basis.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described in this patent application does not, in and of itself, indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

It will be readily apparent that the various methods and algorithms described herein may be implemented by, e.g., appropriately programmed general purpose computers and computing devices. Typically a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term “computer-readable medium” as used herein refers to any medium that participates in providing data (e.g., instructions) that may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, and 3G.

Where databases are described, it will be understood by one of ordinary skill in the art that (i) alternative database structures to those described may be readily employed, (ii) other memory structures besides databases may be readily employed. Any schematic illustrations and accompanying descriptions of any sample databases presented herein are illustrative arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, other formats (including relational databases, object-based models and/or distributed databases) could be used to store and manipulate the data types described herein. Likewise, object methods or behaviors of a database can be used to implement the processes of the present invention. In addition, the databases may, in a known manner, be stored locally or remotely from a device that accesses data in such a database.

In accordance with one or more embodiments, a gaming device is provided. The gaming device comprises a display device for displaying game information to a player, as well as an input device usable by a player to provide an input to the gaming device. The gaming device further comprises a processor operable to facilitate a wagering game and a memory storing a program for directing the processor. The processor and the program are operable to detect an input from a player to the gaming device and determine that the input is an indication that the player may require attention as a problem gambler. The processor and the program are further operable to transmit a signal to a server device, the signal indicating the input from the player. In one embodiment, the gaming device is operable to, based on the determination that the player may require attention as a problem gambler, interrupt play of the gaming device by the player and/or output a message to the player.

In accordance with one or more embodiments, a gaming system is provided. The gaming system comprises a gaming device having a display device for displaying game information to a player and an input device operable by the player to provide an input to the gaming device. The gaming system further comprises a server device in communication with the gaming device. The gaming device is operable to detect that a player has provided an input to the gaming device using the input device. The gaming device is further operable to transmit an indication of the input to the server. The server is operable to determine, based on the input, that the player may require attention as a problem gambler and to dispatch an event in response to the determination. Dispatching the event may comprise, for example, one or more of (i) transmitting an instruction to a casino employee to approach the player; (ii) creating a record in a database; (iii) scoring the indication; (iv) directing a video camera to focus on the player; (v) outputting a message to the player; and (vi) interrupting play of the gaming device by the player.

In accordance with one or more embodiments, a server operable to facilitate a wagering establishment is provided. The server comprises a processor and a memory storing a program for directing the processor. The processor and the memory are operable together to (i) receive an indication from a gaming device, the signal indicative of an input provided by a player to the gaming device; (ii) determine, based on the indication, that the player may require attention as a problem gambler; and (iii) dispatch an event in response to the determination. Dispatching the event may comprise, for example, one or more of (i) transmitting an instruction to a casino employee to approach the player; (ii) creating a record in a database; (iii) scoring the indication; (iv) directing a video camera to focus on the player; (v) outputting a message to the player; and (vi) interrupting play of the gaming device by the player.

With these and other advantages and features of the invention that will become hereinafter apparent, the nature of the invention may be more clearly understood by reference to the following detailed description of the invention, to the appended claims and to the several drawings attached herein.

Referring now to FIG. 1A, an example embodiment 100A of a system in accordance with one or more embodiments is depicted in block diagram form. Embodiment 100A is referred to as system 100A herein. The present invention can be configured to work as a system 100A in a network environment including a controller 105A (e.g., a slot server of a casino) that is in communication, via a communications network 120A, with one or more gaming devices 110A (e.g., slot machines, video poker machines, etc.) and with one or more casino personnel devices 125A. The controller 105A may communicate with any and all of the gaming devices 110A and/or casino personnel devices 125A directly or indirectly, via a wired or wireless medium such as the Internet, LAN, WAN or Ethernet, Token Ring, or via any appropriate communications means or combination of communications means. Each of the gaming devices 110A may comprise computers, such as those based on the Intel® Pentium® processor, that are adapted to communicate with the controller 105A. Any number, type and/or number of types of gaming devices 110A may be in communication with the controller 105A.

Communication between the gaming devices 110A, the casino personnel devices 125A and the controller 105A and/or among the gaming devices 110A may be direct or indirect, such as over the Internet through a Web site maintained by computer on a remote server or over an on-line data network including commercial on-line service providers, bulletin board systems and the like. In yet other embodiments, the gaming devices 110A may communicate with one another and/or the controller 105A over RF, cable TV, satellite links and the like.

Some, but not all, possible communication networks that may comprise the network 120A or be otherwise part of the system 100A include: a local area network (LAN), a wide area network (WAN), the Internet, a telephone line, a cable line, a radio channel, an optical communications line, and a satellite communications link. Possible communications protocols that may be part of the system include: Ethernet (or IEEE 802.3), SAP, ATP, Bluetooth™, and TCP/IP. Communication may be encrypted to ensure privacy and prevent fraud in any of a variety of ways well known in the art.

A variety of communications protocols may be part of the system 100A or another system operable to facilitate the embodiments described herein, including but not limited to: Ethernet (or IEEE 802.3), SAP, SAS™, SuperSAS™, ATP, Bluetooth™, and TCP/IP. Further, in some embodiments, various communications protocols endorsed by the Gaming Standards Association of Fremont, Calif., may be utilized, such as (i) the Gaming Device Standard (GDS), which may facilitate communication between a gaming device and various component devices and/or peripheral devices (e.g., printers, bill acceptors, etc.), (ii) the Best of Breed (BOB) standard, which may facilitate communication between a gaming device and various servers related to play of one or more gaming devices (e.g., servers that assist in providing accounting, player tracking, content management, ticket-in/ticket-out and progressive jackpot functionality), and/or (iii) the System-to-System (S2S) standard, which may facilitate communication between game-related servers and/or casino property management servers (e.g., a hotel server comprising one or more databases that store information about booking and reservations). Communication may be encrypted to ensure privacy and prevent fraud in any of a variety of ways well known in the art.

In some embodiments, a controller 105A may not be necessary and/or preferred. For example, one or more embodiments may be practiced on a stand-alone gaming device 110A and/or a gaming device 110A in communication only with one or more other gaming devices 110A (i.e. without a controller 105A). In such embodiments, any functions described as performed by the controller 105A or data described as stored on the controller 105A may instead be performed by or stored on one or more gaming devices 110A.

In one or more embodiments, system 100A may include additional devices, such as one or more additional servers (e.g., a hotel reservation server, a problem gambler management server, and/or an inventory management server). In accordance with one embodiment, a problem gambler management server may comprise, for example, a server storing information regarding which players have been identified as potentially requiring attention as problem gamblers or who have been identified as requiring attention as problem gamblers, as well as an indication of events that have been dispatched in association with each such determination. Of course, such information may also be stored at controller 105A, as described herein. One or more point-of-sale terminals associated with one or more merchants may also be included in system 100A.

In some embodiments, various casino employees may be equipped with or otherwise utilize one or more casino personnel devices 125A, such as personal digital assistants (PDAs) or other computing devices (e.g., personal computer terminals). A casino personnel device 125A may comprise, for example, one or more of various input devices (e.g., a keypad, a touch-sensitive display screen, a card reader, an infrared bar code scanner, etc.), various output devices (e.g., an LCD screen), a processor, a memory and/or a communications port, as described herein with respect to other devices. In some embodiments, a casino personnel device 125A may communicate with a gaming device, server, kiosk, peripheral device, and/or an inventory/reservation system of a casino-maintained property (e.g., a hotel). Thus, a casino personnel device may be configurable to, among other things, (i) read from and/or write to one or more databases of the present invention, (ii) assist in payments made to players (e.g., a representative "scans" a cashless gaming receipt and determines a value associated with the receipt, and if the receipt is valid, provides payment equal to the value), (iii) assist in payment made by players; (iv) output an instruction to a casino employee to approach a player and/or intervene with the play of a gaming device by a player (e.g., based on a determination that the player may require attention as a problem gambler); and/or (iii) execute or assist in the execution of various other processes described herein. For example, a casino employee may utilize a casino personnel device to (i) obtain, display and/or view information about a player who has provided an input that may indicate that the player qualifies as a problem gambler, (ii) determine a current location of the player, (iii) receive instructions as to how to approach the player, what to say to the player, what information to provide to the player and/or what other actions are to be taken with respect to the player, and/or (iv) receive an input from a casino employee with respect to a player (e.g., a casino employee may walk by a player who has been identified as potentially requiring attention as a problem gambler, determine that the player is most likely not a problem gambler, and input an indication of such a determination to the casino personnel device). In one or more embodiments, a casino personnel device may be operable to read data from and/or write data to one or more of the databases described herein. A memory of a casino personnel device may store a program for executing processes described herein, or portions thereof.

In some embodiments, various merchants (e.g., bars, ATMs, shops, restaurants, etc.) may utilize point-of-sale (POS) computer terminals to facilitate various processes of the present invention. For example, in some embodiments, a player's activities or behavior (or lack thereof) at a merchant may be utilized to determine whether the player qualifies as a problem gambler. In some embodiments, POS terminals may be configured to read from and/or write to one or more databases of the present invention. Such POS terminals may thus comprise various hardware and software described herein with respect to other devices, and may communicate with (i) a casino server, (ii) a gaming device, (iii) an inventory/reservation system (e.g., a computer terminal at a theatre communicates with an inventory database to determine a number of unsold seats for a certain event), and so on.

In some embodiments, the controller 105A may be operable to communicate with one or more servers of a casino other than the casino associated with controller 105A (e.g., to share information regarding problem gamblers). In some embodiments, the controller 105A may be operable to communicate with a device and/or entity having information about problem gamblers (e.g., to access a nationwide self-exclusion list on a server of another entity).

In some embodiments, various component devices (e.g., any or all of the benefit output devices, output devices, input devices and/or input output devices described herein) may be embodied as peripheral devices. For example, such devices may not necessarily be components of a gaming device, though they may be configured in such a manner so as to communicate with one or more gaming device processors or any other devices described herein. For example, a peripheral device such as a large display device may be associated with a plurality of gaming devices, and thus may not necessarily be considered a component of any one gaming device. Further, in some embodiments, certain peripheral devices such as card readers may be interchangeable between gaming devices, and thus may be considered a component of a first gaming device while connected thereto, removed from the first gaming device, connected to a second gaming device, and so on. In other embodiments, various peripheral devices may never be considered a component of a particular gaming device. For example, in some embodiments, a peripheral device such as a USB-based portable memory device may store (i) one or more databases described herein, and/or (ii) a program for executing one or more process steps described herein. Such a peripheral device may then be utilized by casino personnel for upgrading/retrofitting existing gaming devices as described herein.

Figure 1B:
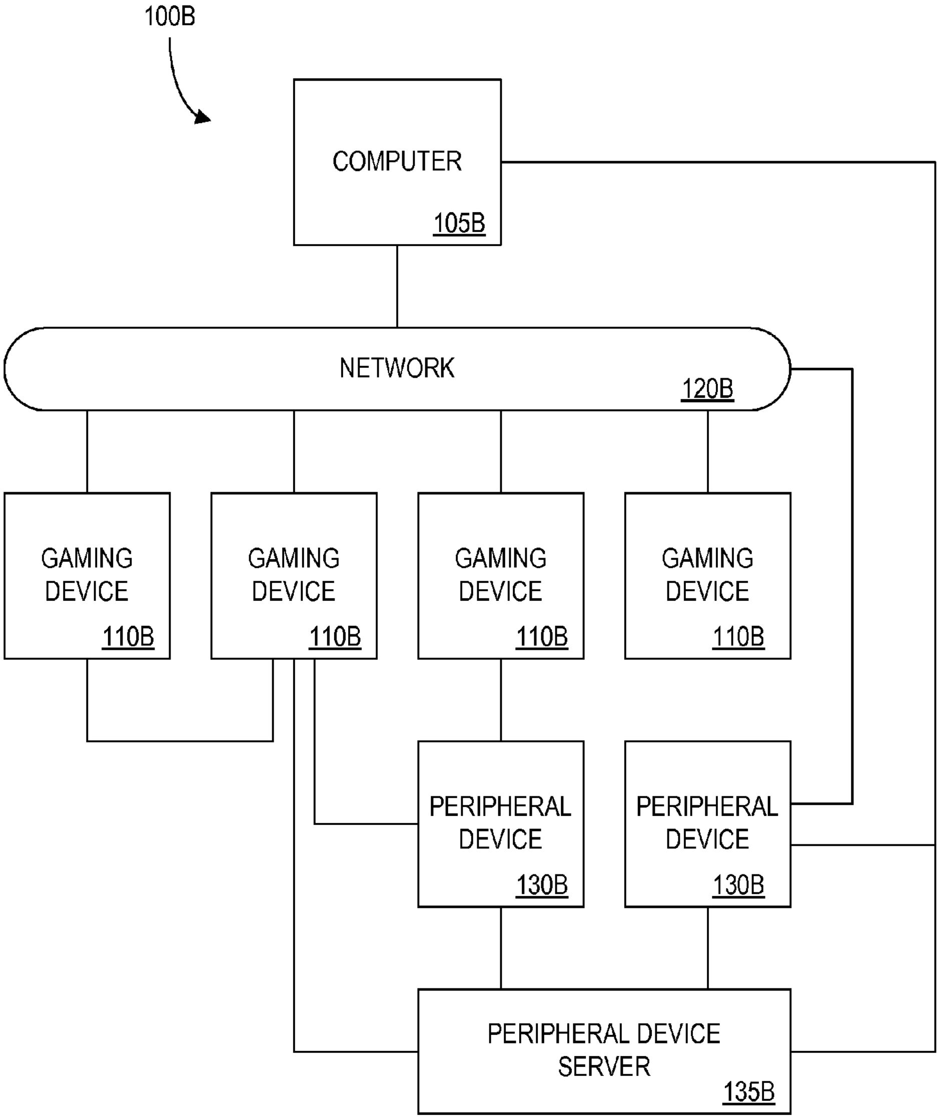
FIG. 1B is a block diagram of another example embodiment of a system, in accordance with at least one embodiment.

Referring now to FIG. 1B, a block diagram of another system 100B according to at least one embodiment includes a controller 105B (e.g., a slot server of a casino) that is in communication, via a communications network 120B, with one or more gaming devices 110B (e.g., slot machines, video poker machines). A difference between system 100A (FIG. 1A) and system 100B (FIG. 1B) is that in system 100B at least one gaming device 110B is also in communication with one or more peripheral devices 130B. A peripheral device 130B may, in turn, be in communication with a peripheral device server 135B and, in some embodiments, with controller 105B. In one or more embodiments the peripheral device server 135B may be in communication with one or more gaming devices 110B and/or controller 105B.

The controller 105B may communicate with one or more of the gaming devices 110B and/or one or more of the peripheral devices 130B directly or indirectly, via a wired or wireless medium such as the Internet, LAN, WAN or Ethernet, Token Ring, or via any appropriate communications means or combination of communications means. For example, the controller 105B may communicate directly with one of the gaming devices 110B (e.g., via a LAN) and indirectly (e.g., via a gaming device 110B) with a peripheral device 130B. In another example, the controller 105B may communicate with one of the gaming devices 110B via a LAN and with another of the gaming devices 110B via the Internet (e.g., if the particular gaming device comprises a personal computer in communication with an online casino).

At least one of the gaming devices 110B and the peripheral devices 130B may comprise computers, such as those based on the Intel® Pentium® processor, that are adapted to communicate with the controller 105B. Further, at least one of the gaming devices 110B may comprise a gaming device such as a mechanical or electronic slot machine, a video poker machine, a video blackjack machine, a video keno machine, a pachinko machine, a video roulette machine, and/or a lottery terminal. Further yet, at least one of the peripheral devices 130B may comprise an external or internal module associated with one or more of the gaming devices 110B that is capable of communicating with one or more of the gaming devices 110B and of directing the one or more gaming devices 110B to perform one or more functions. Any number of gaming devices 110B may be in communication with the controller 105. Any number and type of peripheral devices 130B may be in communication with a gaming device 110B, peripheral device server 135B and/or controller 105B.

Communication between the gaming devices 110B and the controller 105B, between the gaming devices 110B and peripheral devices 130B, between peripheral device server 135B and the peripheral devices 130B and/or the gaming devices 110B, between the peripheral device server 135B and controller 105B, among the gaming devices 110B, and/or among the peripheral devices 130B may be direct or indirect, such as over the Internet through a Web site maintained by controller 105B on a remote server or over an on-line data network including commercial on-line service providers, bulletin board systems and the like. In yet other embodiments, any and all of the devices of system 100B (i.e., the gaming devices 110B, the peripheral devices 130B, the controller 105B, and the peripheral device server 135B) may communicate with one another over RF, cable TV, satellite links and the like.

System 100B, like system 100A, may include additional or different components, such as one or more kiosks, one or more POS systems, one or more additional servers and/or one or more casino personnel devices.

Some, but not all, possible communication networks that may comprise network 120B or otherwise be part of system 100B include: a local area network (LAN), a wide area network (WAN), the Internet, a telephone line, a cable line, a radio channel, an optical communications line, a satellite communications link. Possible communications protocols that may be part of system 100B include: Ethernet (or IEEE 802.3), SAP, ATP, Bluetooth™, and TCP/IP. Communication may be encrypted to ensure privacy and prevent fraud in any of a variety of ways well known in the art.

In an embodiment, the controller 100B may not be necessary and/or preferred. For example, the present invention may, in one or more embodiments, be practiced on a stand-alone gaming device 110B, one or more gaming devices 110B in communication with one or more peripheral devices 130B, one or more gaming devices 110B in communication with peripheral device server 135B, one or more peripheral devices 130B in communication with peripheral device server 135B, and/or a gaming device 110B in communication only with one or more other gaming devices 110B. In such an embodiment, any functions described as performed by the controller 105B and/or data described as stored in a memory of the controller 105B may instead be performed by or stored on one or more gaming devices 110B, one or more peripheral devices 130B, and/or peripheral device server 135B.

Similarly, peripheral device server 135B may not be desired and/or needed in some embodiments. In embodiments that do not involve peripheral device server 135B, any or all of the functions described herein as being performed by peripheral device server 135B may instead be performed by controller 105, one or more gaming devices 110B, one or more peripheral devices 130B, or a combination thereof. Similarly, in embodiments that do not involve peripheral device server 135B any data described herein as being stored in a memory of peripheral device server 135B may instead be stored in a memory of controller 105B, one or more gaming devices 110B, one or more peripheral devices 130B, or a combination thereof.

Any or all of the gaming devices 110B may, respectively, include or be in communication with a peripheral device 130B. A peripheral device 130B may be a device that obtains (e.g., receives, derives, analyzes, detects and/or reads) information from (and/or transmits information to) one or more gaming devices 1106. For example, a peripheral device 130B may be operable to obtain information about inputs being input by a player to the gaming device (e.g., a game initiation input, a cash-out request, a payline selection, a wager amount selection, etc.). For example, a peripheral device 130B may monitor activities carried out by a processor of a gaming device 1106 and/or information being received by a processor of a gaming device 1106.

As described, in one or more embodiments, one or more peripheral devices 130B may be in communication with a peripheral device server 135B. Such an arrangement may allow the peripheral device server 135B to receive information regarding a plurality of games being played on a plurality of gaming devices 1106. The peripheral device server 135B, in turn, may be in communication with the controller 105B. Of course, in other embodiments, one or more peripheral devices 130B may communicate with controller 105B directly. It should be understood that any functions described herein as performed by a peripheral device 130B may also or instead be performed by the peripheral device server 135B.

Similarly, any data described herein as being stored on or accessed by a peripheral device 130B may also or instead be stored on or accessed by the peripheral device server 135B.

In one embodiment, a peripheral device 130B may be operable to access a database (e.g., of peripheral device server 135B) to output messages and/or signals. For example, a peripheral device may transmit a signal to another device, the signal indicating that a player currently playing a gaming device has been identified as potentially requiring attention as a problem gambler. In another example, a peripheral device may be directed by another device (or by its own processor) to output a message to a player of a gaming device associated with the peripheral device (e.g., a message targeted at curbing the problem gambler's gambling behavior). In some embodiments, a peripheral device 130B may also be operable to access a database (e.g., a problem gambler database, as described below) to write information to the database. For example, the peripheral device may be operable to cause an indication of an input from a player to a gaming device to be stored in a record of the problem database that is associated with the player. For example, the peripheral device may cause an indication of the player's aggression towards the gaming device (e.g., hitting or yelling at the gaming device) to be stored and/or an indication of the player's attempt to initiate a game play prior to a resolution of a previously initiated game play to be stored. As described in more detail below, in some embodiments one or more of these behaviors may be an indication that a player qualifies as a potential problem gambler.

In one or more embodiments, peripheral device server 135B may also monitor player gambling history over time by associating gambling behavior with player identifiers, such as player tracking card numbers or player photos. For example, in embodiments in which changes in player's gambling patterns are monitored (e.g., what time of day or week does a player typically gamble), a peripheral device server 135B store an indication of each time that a player gambles. Further, information about the player obtained or accessed by peripheral device server 135 may be analyzed, e.g., to identify those players who may require attention as problem gamblers. For example, if a player has typically only gambled during evenings and on the weekends but suddenly and consistently starts to gamble during weekdays, such a change in gambling behavior may be determined to be an indication that the player qualifies as a problem gambler. Based upon desired objectives, the peripheral device server 135B may direct the appropriate peripheral device 130B to issue messages to specific players. For example, a message including a link and/or telephone number to a gamblers anonymous hotline may be output to a player who is determined to potentially require attention as a problem gambler.

Information received by a peripheral device 130B from a gaming device 110B may include gambling data such as number of games initiated per unit of time, indications of any inputs provided by the player to the gaming device (e.g., cash-out requests, coin-in, times of initiation of game plays, selections of paylines, selections of wagers, etc), outcomes displayed for games initiated, payouts corresponding to outcomes displayed, a credit meter balance of the gaming device, and/or data associated with the player currently playing the gaming device 130B.

In one embodiment, a peripheral device 130B may comprise one or more sensors associated with a gaming device. For example, a peripheral device 130 may comprise one or more of (i) a microphone for detecting sounds emitted by a player of a gaming device; (ii) a weight sensor for detecting a player sitting in a chair associated with a gaming device; (iii) a tilt sensor for detecting a player tilting or moving a gaming device (e.g., if a player attempts to shake a gaming device); (iv) a camera for capturing images of a player and/or gaming device and/or (v) one or more pressure sensors for detecting whether a player has hit a gaming device. Such sensors may be utilized, for example, in embodiments in which a player displaying aggressive behavior towards a gaming device is interpreted as an indication that the player may require attention as a problem gambler and/or as a factor in determining whether the player qualifies as a problem gambler.

The functions described herein as being performed by a peripheral device server 135B and/or a peripheral device 130B may, in one or more embodiments, be performed by the controller 105B (in lieu of or in conjunction with being performed by a peripheral device server 135B and/or a peripheral device 130B). Such functions may be performed by controller 105B in system 100A (FIG. 1A) or by controller 105A in system 100B (FIG. 1B).

In one or more embodiments, a peripheral device 130B may be useful for implementing the embodiments of the present invention into the operation of an otherwise conventional gaming device or in minimizing the adjustments necessary to a gaming device or a program thereof. For example, in order to avoid or minimize the necessity of modifying or replacing a program already stored in a memory of a conventional gaming device, an external or internal module that comprises a peripheral device 130B may be inserted in or associated with the gaming device. For example, a conventional gaming device may be retrofitted with a peripheral device 130B in order to implement one or more embodiments of the present invention.

Thus, for example, a peripheral device 1306 may be utilized to monitor play or other behavior of a player at a gaming device and output messages to the player. In such embodiments the gaming device 1106 with which the peripheral device 1306 is in communication with may continue to operate conventionally. In such embodiments the gaming device 1106 may continue to output outcomes, payouts, and/or bonuses for each game played. The peripheral device 130B may output messages to the player, capture images of the player and/or gaming device, capture data relevant to the player's behavior at the gaming device, and/or transmit indications of such behavior to another device. In one embodiment, a peripheral device 1306 may be operable to affect the operation of an associated gaming device 1106. For example, a peripheral device 130B may be operable to interrupt the play of an associated gaming device 1106 (e.g., in response to receiving a signal from another device).

Accordingly, a peripheral device 130B may include (i) a communications port (e.g., for communicating with one or more gaming devices 1106, peripheral device server 135B, another peripheral device 130B, and/or controller 105B); (ii) a display (e.g., for displaying messages), (iii) another output means (e.g., a speaker, light, or motion device to communicate with a player), (iv) an input device (e.g., for receiving inputs from a casino employee or from another device).

In one or more embodiments, a peripheral device 130B associated with a gaming device 1106 may not output messages to a player but may instead direct the processor of the gaming device to perform such functions. For example, a program stored in a memory of a peripheral device 1306 may cause a processor of a gaming device 1106 to perform certain functions. For example, a program stored in a memory of peripheral device 1306 may cause a processor of a gaming device 1106 to output a message, access a database, transmit a signal or indication, interrupt play of the gaming device, capture an image of a player of the gaming device and/or communicate with another device.

Note that, in one or more embodiments, a gaming device 1106 and a peripheral device 130B that is associated with the gaming device may not communicate with one another at all. Each may, however, communicate with a computer or other device. For example, the gaming device may communicate with controller 105B and the associated peripheral device 130B may communicate with peripheral device server 135B and/or controller 105B. For example, if both gaming device 1106 and peripheral device 130B are in communication with controller 105B, each may obtain information associated with the other through controller 105B.

Figure 2A:
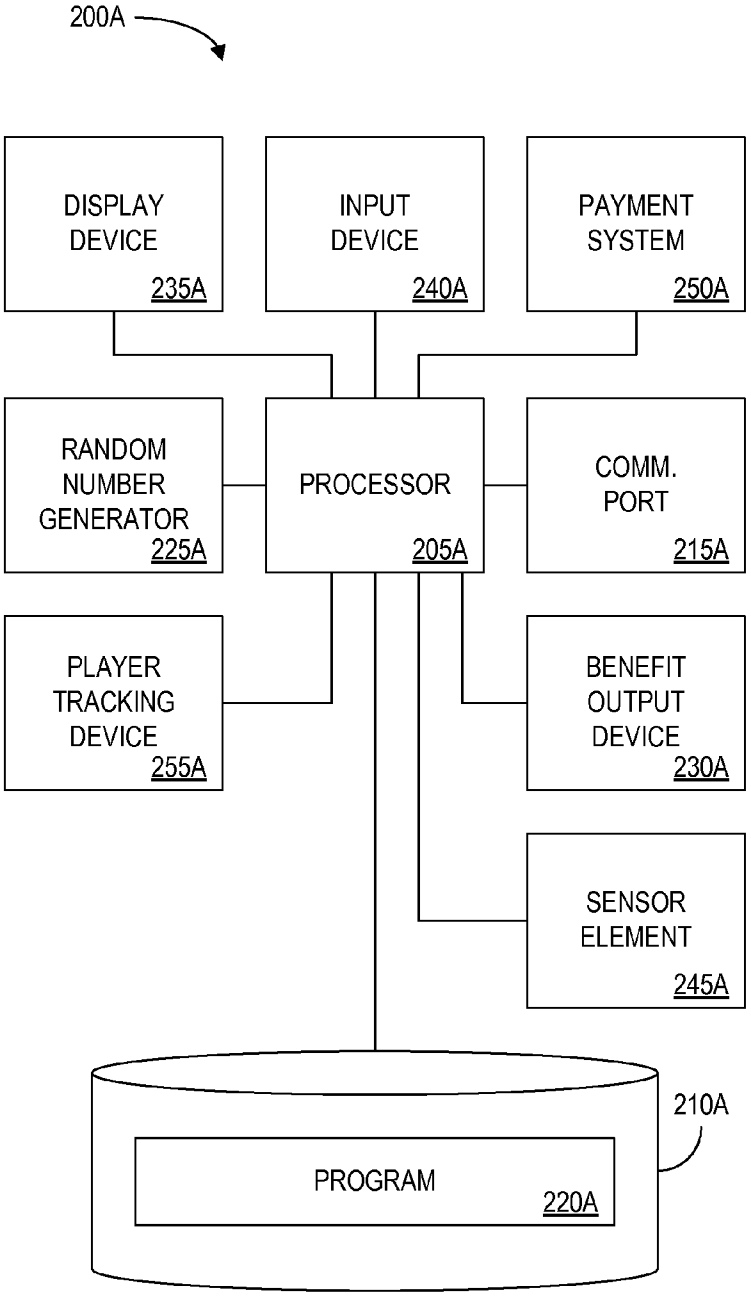
FIG. 2A is a block diagram of an example embodiment of a gaming device, in accordance with at least one embodiment.

Referring now to FIG. 2A, illustrated therein is a block diagram of an embodiment 200A of a gaming device (e.g., a gaming device 110A and/or a gaming device 110B). The embodiment 200A is referred to herein as gaming device 200A. The gaming device 200A may be implemented as a system controller, a dedicated hardware circuit, an appropriately programmed general-purpose computer, or any other equivalent electronic, mechanical or electro-mechanical device. The gaming device 200A may comprise, for example, a slot machine, a video poker terminal, a video blackjack terminal, a video keno terminal, a video lottery terminal, a pachinko machine or a table-top game. In various embodiments, a gaming device may comprise, for example, a personal computer (e.g., which communicates with an online casino Web site), a telephone (e.g., to communicate with an automated sports book that provides gaming services), or a portable handheld gaming device (e.g., a personal digital assistant or Nintendo GameBoy). In some embodiments, the gaming device 200A may comprise a device operable to facilitate a table game (e.g., a device operable to monitor a blackjack game, such as size of a player's wager, cards received and/or decisions made). The gaming device 200A may comprise any or all of the gaming devices 110A of system 100A (FIG. 1A) and/or any or all of the gaming devices 110B of system 100B (FIG. 1B). In some embodiments, a user device such as a PDA or cell phone may be used in place of, or in addition to, some or all of the gaming device 200A components depicted in FIG. 2A.

Further, a gaming device 200A may comprise a personal computer or other device operable to communicate with an online casino and facilitate game play at the online casino. In one or more embodiments, the gaming device 200A may comprise a computing device operable to execute software that simulates play of a reeled slot machine game, video poker game, video blackjack game, video keno game, video roulette game, or lottery game.

The example gaming device 200A comprises a processor 205A, such as one or more Intel® Pentium® processors. The processor 205A is in communication with a memory 210A and a communication port 215A (e.g., for communicating with one or more other devices, such as with a peripheral device 130B and/or a controller 105A). The memory 210A may comprise an appropriate combination of magnetic, optical and/or semiconductor memory, and may include, for example, Random Access Memory (RAM), Read-Only Memory (ROM), a compact disc and/or a hard disk. The memory 210A may comprise or include any type of computer-readable medium. The processor 205A and the memory 210A may each be, for example: (i) located entirely within a single computer or other device; or (ii) connected to each other by a remote communication medium, such as a serial port cable, telephone line or radio frequency transceiver. In one embodiment, the gaming device 200A may comprise one or more devices that are connected to a remote server computer for maintaining databases.

The memory 210A stores a program 220A for controlling the processor 205A. The processor 305 performs instructions of the program 220A, and thereby operates in accordance with the present invention, and particularly in accordance with the methods described in detail herein. The program 220A, as well as any other program for controlling a processor described herein, may be stored in a compressed, uncompiled and/or encrypted format. The following description of program 220A applies equally to all programs for directing a processor described herein. The program 220A furthermore includes program elements that may be necessary, such as an operating system, a database management system and "device drivers" for allowing the processor 205A to interface with computer peripheral devices. Appropriate program elements are known to those skilled in the art, and need not be described in detail herein.

According to an embodiment, the instructions of the program 220A may be read into a main memory from another computer-readable medium, such from a ROM to RAM. Execution of sequences of the instructions in program 220A may cause processor 205A to perform one or more process steps described herein. In alternate embodiments, hard-wired circuitry may be used in place of, or in combination with, software instructions for implementation of the processes of the present invention. Thus, embodiments described herein are not limited to any specific combination of hardware and software. As discussed with respect to system 100B of FIG. 1B, execution of sequences of the instructions in a program of a peripheral device 130B in communication with gaming device 200A may also cause processor 205A to perform some or all of the process steps described herein.

The memory 210A may also store one or more databases. For example, memory 210A may store one or more of a probability database (not shown) and a payout database (not shown).

The fields of a probability database may specify, for example: (i) a random number (or range of random numbers) that may be generated by a random number generator; and (ii) an outcome that indicates the one or more indicia comprising the outcome that corresponds to the random number of a particular record. A gaming device 200A may utilize a probability database to determine, for example, what outcome corresponds to a random number generated by a random number generator and to display the determined outcome. The outcomes may comprise the three symbols to be displayed along the payline of a three-reel slot machine. Other arrangements of probability databases are possible. For example, the book "Winning At Slot Machines" by Jim Regan (Carol Publishing Group Edition, 1997) illustrates examples of payout and probability tables and how they may be derived. The entirety of this book is incorporated by reference herein for all purposes.

The fields of a payout database may specify, for example: (i) an outcome, which indicates the one or more indicia comprising a given outcome; and (ii) a payout that corresponds to each respective outcome. If gaming device 200A comprises a three-reel slot machine, for example, the outcomes may be those obtained on a three-reel slot machine.

A gaming device 200A may utilize a payout database to determine whether a payout should be output to a player as a result of an outcome obtained for a game. For example, after determining the outcome to output on the gaming device, the gaming device may access the payout database to determine whether the outcome for output is one of the outcomes stored as corresponding to a payout. If it is, the gaming device may provide the corresponding payout to the player via a benefit output device described herein. Other arrangements of payout databases are possible. For example, the book "Winning At Slot Machines" by Jim Regan (Carol Publishing Group Edition, 1997), previously incorporated by reference, illustrates many examples of payout and probability tables and how they may be derived.

In one or more embodiments, as described, data may be stored in a memory of another device (e.g., a database of controller 105A or a database of another server device). In one or more embodiments, gaming device 200A may be operable to access the data thereof or have information associated with the data stored therein downloaded to the gaming device as necessary and/or appropriate. For example, gaming device 200A may access a memory of another device to determine whether a player has previously been identified as potentially a problem gambler, whether an event has been previously dispatched with respect to the player, and/or to determine an action to take with respect to a player that the gaming device has identified as potentially a problem gambler.

In one embodiment, memory 210A may store a database of events or actions on the part of the player that may trigger the gaming device 200A to transmit an indication to another device (e.g., controller 105A) that a player currently playing the gaming device 200A may require attention as a problem gambler. Of course, in other embodiments such a list may not be stored in a database form but may rather be stored in another form (e.g., as instructions or code that comprise the program 220A or a subroutine thereof. Irrespective of the form in which such a list is stored, the following is an example list of events or actions on the part of the player, the occurrence or detection of one or more of which may cause the gaming device 200A to transmit such an indication:

(i) a player actuates or attempts to actuate an input device of the gaming device (e.g., a reel starting mechanism) during an inactive state of the input device (e.g., the player has attempted to spin the reels when the reels have not yet stopped spinning from a previously initiated game play);

(ii) the player has selected or attempted to select a feature or option not available to the player (e.g., the player has attempted to select a wager amount not available to the player due to an insufficient credit meter balance or a payline or number of paylines not available to the player due to an insufficient credit meter balance);

(iii) the player has engaged in certain wagering behavior, as described herein;

(iv) the player has engaged in certain coin-in behavior, as described herein;

(v) the player has engaged in certain cash-out behavior, as described herein; and (vi) the player has engaged a certain video poker strategy, as described herein.

It should be noted that, in accordance with some embodiments and as described herein, a player repeatedly or persistently performing one of the above actions or engaging in one of the above patterns of behavior may be a trigger for transmitting an indication that the player may require attention as a problem gambler while the player performing one or more of the above actions or engaging in one of the above behaviors on an isolated or occasional basis may not. A player may be considered to have performed an action or engaged in a behavior repeatedly or persistently, for example, if the player performs the action or engages in the behavior a predetermined minimum number of times (or a predetermined minimum number of consecutive times) within a predetermined unit of time. For example, if a player once or occasionally attempts to select a payline or number of paylines unavailable to the player due to an insufficient credit balance and/or attempts to start the spinning of the reels before the reels have stopped spinning from a prior game play may not cause any signal or indication to be transmitted. However, if a player persistently attempts to start the reels again before the reels stop spinning from a previously initiated game play (e.g., the player is constantly tapping or pressing the reel start button of a slot machine), this behavior may cause a signal or indication that the player may require attention as a problem gambler to be transmitted to another device. Of course, in some embodiments a device besides the gaming device 200A may analyze, process or compare a player's actions or patterns of behavior to determine whether the player to determine whether the player may require attention as a problem gambler. In such embodiments, the gaming device 200A may simply transmit an indication of each player action or each qualifying player action to the other device (or the other device may otherwise determine each such player action or qualifying player action) in order to perform the analysis, processing or comparison.

Note that, although the databases and list described above are described as being stored in a gaming device 200A, in other embodiments of the present invention some or all of these databases and/or list may be partially or wholly stored (in addition to or in lieu of being stored in the memory 210A of the gaming device 200A) in another device. Such other device may comprise, for example, one or more of the peripheral devices 130B, another gaming device 110A or 110B, the peripheral device server 135B, controller 105A, controller 105B, another device and/or a combination thereof. Further, some or all of the data described as being stored in the databases and/or list described above may be partially or wholly stored (in addition to or in lieu of being stored in the memory 210A of the gaming device 200A) in a memory of one or more other devices. Such other device may comprise, for example, one or more of the peripheral devices 130B, another gaming device 110A or 110B, the peripheral device server 135B, controller 105A, controller 105B, another device and/or a combination thereof.

The processor 205A is also operable to communicate with a random number generator 225A, which may be a component of gaming device 200A. The random number generator 225A (as well as any other random number generator described herein), in accordance with at least one embodiment, may generate data representing random or pseudo-random values (referred to as "random numbers" herein). The random number generator may generate a random number every predetermined unit of time (e.g., every second) or in response to an initiation of a game on the gaming device. In the former embodiment, the generated random numbers may be used as they are generated (e.g., the random number generated at substantially the time of game initiation is used for that game) and/or stored for future use.

A random number generator, as used herein, may be embodied as a processor separate from but working in cooperation with processor 205A. Alternatively, a random number generator may be embodied as an algorithm, program component, or software stored in the memory of a gaming device or other device and used to generate a random number.

Note that, although the generation or obtainment of a random number is described herein as involving a random number generator of a gaming device, other methods of determining a random number may be employed. For example, a gaming device owner or operator may obtain sets of random numbers that have been generated by another entity. Hot- Bits™, for example, is a service that provides random numbers that have been generated by timing successive pairs of radioactive decays detected by a Geiger-Muller tube interfaced to a computer. A blower mechanism that uses physical balls with numbers thereon may be used to determine a random number by randomly selecting one of the balls and determining the number thereof.

The processor 205A is also operable to communicate with a benefit output device 230A, which may be a component of gaming device 200A. The benefit output device 230A may comprise one or more devices for outputting a benefit to a player of the gaming device 200A. For example, in one embodiment the gaming device 200A may provide coins and/or tokens as a benefit. In such an embodiment the benefit output device 230A may comprise a hopper and hopper controller, for dispensing coins and/or tokens into a coin tray of the gaming device 200A.

In another example, the gaming device 200A may provide a receipt or other document on which there is printed an indication of a benefit (e.g., a cashless gaming receipt that has printed thereon a monetary value, which is redeemable for cash in the amount of the monetary value). In such an embodiment the benefit output device 230A may comprise a printing and document dispensing mechanism. In yet another example, the gaming device 200A may provide electronic credits as a benefit (which, e.g., may be subsequently converted to coins and/or tokens and dispensed from a hopper into a coin tray). In such an embodiment the benefit output device 230A may comprise a credit meter balance and/or a processor that manages the amount of electronic credits that is indicated on a display of a credit meter balance. The processor may be the processor 205A or another processor. In yet another example, the gaming device 200A may credit a monetary amount to a financial account associated with a player as a benefit provided to a player. The financial account may be, for example, a credit card account, a debit account, a charge account, a checking account, and/or a casino account. In such an embodiment the benefit output device 230A may comprise a device for communicating with a server on which the financial account is maintained.

Note that, in one or more embodiments, the gaming device 200A may include more than one benefit output device 230A even though only one benefit output device is illustrated in FIG. 2A. For example, the gaming device 200A may include both a hopper and hopper controller combination and a credit meter balance. Such a gaming device may be operable to provide more than one type of benefit to a player of the gaming device. A single benefit output device 230A may be operable to output more than one type of benefit. For example, a benefit output device 230A may be operable to increase the balance of credits in a credit meter and communicate with a remote device in order to increase the balance of a financial account associated with a player.

The processor 205A is also operable to communicate with a display device 235A, which may be a component of gaming device 200A. The display device 235A may comprise, for example, one or more display screens or areas for outputting information related to game play on the gaming device, such as a cathode ray tube (CRT) monitor, liquid crystal display (LCD) screen, or light emitting diode (LED) screen.

In one or more embodiments, a gaming device 200A may comprise more than one display device 235A. For example, a gaming device 200A may comprise an LCD display for displaying electronic reels and a display device that comprises a viewing window behind which are located mechanical reels and which displays the rotation of the mechanical reels during game play.

In one embodiment, a display device 235A may be operable to display a message to a player. For example, a message targeted at curbing the gambling behavior (e.g., inappropriate gambling behavior) of a player identified as a problem gambler may be output. Such a message may, for example, present the player with a questionnaire for aiding the player in determining whether the player has a problem with gambling and/or may provide the player with information about a helpline or organization (e.g., a Gamblers Anonymous organization) that can help the player to control the inappropriate gambling behavior. In one embodiment, the message may output to the player information about the player's own gambling behavior, to illustrate to the player why the player may be a problem gambler (e.g., did you know you have lost $500/day over the last four days and have not taken any breaks for the last three hours of gambling?).

The processor 205A may also be in communication with one or more other devices besides the display device 235A, for outputting information (e.g., to a player or another device). Such other one or more output devices may also be components of gaming device 200A. Such other one or more output devices may comprise, for example, an audio speaker (e.g., for outputting a message to a player, in addition to or in lieu of such a message being output via a display device 235A), an infra-red transmitter, a radio transmitter, an electric motor, a printer (e.g., such as for printing cashless gaming vouchers), a coupon or product dispenser, an infra-red port (e.g., for communicating with a second gaming device or a portable device of a player), a Braille computer monitor, and a coin or bill dispenser. For gaming devices, common output devices include a cathode ray tube (CRT) monitor on a video poker machine, a bell on a gaming device (e.g., rings when a player wins), an LED display of a player's credit balance on a gaming device, an LCD display of a personal digital assistant (PDA) for displaying keno numbers.

The display device 235A may comprise, for example, one or more distinct display areas and/or one or more distinct display devices. For example, one of the display areas may display outcomes of games played on the gaming device (e.g., electronic reels of a gaming device). Another of the display areas may display rules for playing a game of the gaming device. Yet another of the display areas may display the benefits obtainable by playing a game of the gaming device (e.g., in the form of a payout table). Yet another of the display areas may display messages to the player (e.g., messages targeted at curbing inappropriate gambling behavior of problem gamblers or potential problem gamblers). In one or more embodiments, the gaming device 200A may include more than one display device, one or more other output devices, or a combination thereof (e.g., two display devices and two audio speakers).

The processor 205A is also in communication with an input device 240A, which is a device that is capable of receiving an input (e.g., from a player or another device) and which may be a component of gaming device 200A. An input device may communicate with or be part of another device (e.g. a server, a gaming device, etc.). Some examples of input devices include: a bar-code scanner, a magnetic stripe reader, a computer keyboard or keypad, a button (e.g., mechanical, electromechanical or "soft", as in a portion of a touch-screen), a handle, a keypad, a touch-screen, a microphone, an infrared sensor, a voice recognition module, a coin or bill acceptor, a sonic ranger, a computer port, a video camera, a motion detector, a digital camera, a network card, a universal serial bus (USB) port, a GPS receiver, a radio frequency identification (RFID) receiver, an RF receiver, a thermometer, a pressure sensor, an infrared port (e.g., for receiving communications from with a second gaming device or a another device such as a smart card or PDA of a player), and a weight scale. For gaming devices, common input devices include a button or touch screen on a video poker machine, a lever or handle connected to the gaming device, a magnetic stripe reader to read a player tracking card inserted into a gaming device, a touch screen for input of player selections during game play, and a coin and bill acceptor. Input device 240A may comprise any of the above-described input device or any combination thereof (i.e., input device 240A may comprise more than one input device).

In some embodiments, a gaming device 200A may comprise components capable of facilitating both input and output functions (i.e., input/output devices). In one example, a touch-sensitive display screen comprises an input/output device (e.g., the device outputs graphics and receives selections from players). In another example, a processor may communicate with a "ticket-in/ticket-out" device configured to dispense and receive cash-out tickets. Such a device may also assist in (e.g., provide data so as to facilitate) various accounting functions (e.g., ticket validation and redemption). For example, any or all of a gaming device, kiosk and casino personnel device maintained at a cashier cage may (i) comprise such a benefit input/output device, and/or (ii) communicate with a central server that manages the accounting associated with such ticket-in/ticket-out transactions (e.g., so as to track the issuance, redemption and expiration of such tickets). One example of ticket-in/ticket-out technology that may be adapted or utilized to implement embodiments described herein is the EZ Pay™ system, is manufactured by International Gaming Technology, headquartered in Reno, Nev.

Of course, as would be understood by one of ordinary skill in the art, a gaming device 200A may comprise various combinations of any or all of the component devices described herein. For example, in one or more embodiments, the gaming device may include more than one display device, one or more other output devices, several input devices, and so on (e.g., two display screens, two audio speakers, a headset, a ticket-in/ticket-out device and several buttons).

One example of a particular input device 240A that may be a component of gaming device 200A is a sensor element 245A. A sensor element 245A may be a component of gaming device 200A or may be otherwise associated with gaming device 200A (and, e.g., be operable to provide information to gaming device 200A). A sensor element 245A may comprise any device or combination of devices operable to detect, receive an indication of, measure, determine, and/or deduce (i) a change in a parameter, (ii) a value of a parameter, and/or (iii) a state of a device and/or parameter. In particular, in some embodiments a sensor element 245A may comprise an element, component, device, mechanism or other means for sensing information associated with a player playing the gaming device 200A. For example, a sensor element 245A may comprise one or more of the following:

(i) a pressure or weight sensor in a seat associated with the gaming device 200A, operable to determine when someone has sat in the seat and gotten up from the seat;

(ii) a sensor associated with one or more buttons (or a plurality of sensors, each sensor associated with a respective button) of the gaming device 200A, operable to determine when the one or more buttons have been actuated, even if at the time of actuation the one or more buttons are in an inactive state;

(iii) a tilt and/or shake sensor operable to determine when the gaming device 200A has been tilted or shaken;

(iv) one or more pressure sensors in or on the cabinet housing of the gaming device 200A, operable to determine when the gaming device 200A has been struck or hit;

(v) a camera for capturing images and/or analyzing images (e.g., an expression of a player, an eye position of the player, a change in expression and/or eye position of a player);

(vi) a microphone operable to determine a sound uttered by a player (e.g., to determine whether the player is cursing or yelling or otherwise expressing aggression at the gaming device 200A); and (vii) a sensor for determining an amount of currency provided to the gaming device.

It should be noted, with reference to item (ii) in the above list that, in accordance with some embodiments, it may be desirable to determine whether a player has actuated (or otherwise select or initiate) or attempted to actuate (or otherwise select or initiate) an input device of the gaming device 200A during an inactive state of the input device. An input device may be considered to be in an inactive state, for example, if the event, action, instruction or other subroutine normally triggered within the gaming device in response to the player actuating or selecting the input device is not available, is not triggered and/or is unable to be executed by the gaming device. Perhaps the only event that is triggered at the gaming device by the player attempting to actuate or actuating an input device during an inactive state of the gaming device is an output of an indication to the player that the gaming device is in an inactive state and/or that the desired action cannot be performed by the gaming device. For example, it may be desirable to determine that a player has attempted to actuate or otherwise initiate a reel starting mechanism of the gaming device 200A during an inactive state of the reel starting mechanism. A reel starting mechanism may be in an inactive state, for example, when the reels have not yet stopped spinning from a previously initiated game play. It may be desirable to determine this because Applicants have recognized that a player attempting to start the reels of a gaming device before the reels have stopped spinning from a previously initiated game play (or, similarly and in a video poker device, to deal a new set of initial cards before the previous hand has been resolved) may be a sign or indication of a problem gambler.

In conventional gaming devices, a player attempting to actuate or actuating (or otherwise selecting, attempting to select or initiate) an input device during an inactive state of the gaming device is simply not recognized, or is ignored by the gaming device. As described, at most an indication of the inactive state is output in response to the player actuating or attempting to actuate the input device during the inactive state. In other words, the event, action or subroutine otherwise associated with the input device or actuation of the input device is not triggered and an indication of the player actuating or attempting to actuate the input device during the inactive state is not recognized as a significant event by the gaming device or any other device associated with the gaming device. In contrast, in embodiments described herein, Applicants have recognized that such an action on behalf of a player provides valuable information or potentially valuable information (e.g., whether the player may require attention as a problem gambler) and such an action should be recognized, captured, detected or otherwise determined by the gaming device (or another device, such as a peripheral device associated therewith).

Accordingly, Applicants have invented an apparatus and methods for recognizing such a player action. It should be noted that the above description of determining that a player has actuated or attempted to actuate an input device during an inactive state of the input device applies equally to a player selecting or attempting to select a feature or option of the gaming device that is unavailable to the player (e.g., due to an insufficient credit meter balance). For example, determining that a player has attempted to select (e.g., on a repeated or persistent basis) a maximum wager amount and/or a maximum number of paylines on a reeled slot machine when the player does not have sufficient credit in the credit meter balance to fund this selection may be an indication that the player may require attention as a problem gambler.

The processor 205A is also in communication with a payment system 250A, which may be a component of gaming device 200A. The payment system 250A is a device capable of accepting payment from a player (e.g., a bet or initiation of a balance) and/or providing payment to a player (e.g., a payout). Payment is not limited to currency, but may also include other types of consideration, including products, services, and alternate currencies. Payment system 250A may be considered to be an example of an input device 240A in some embodiments.

Exemplary methods of accepting payment by the payment system 250A include (i) receiving hard currency (i.e., coins or bills), and accordingly the payment system 250A may comprise a coin or bill acceptor; (ii) receiving an alternate currency (e.g., a paper cashless gaming voucher, a coupon, a non-negotiable token), and accordingly the payment system 250A may comprise a bar code reader or other sensing means; (iii) receiving a payment identifier (e.g., a credit card number, a debit card number, a player tracking card number) and debiting the account identified by the payment identifier; and (iv) determining that a player has performed a value-added activity.

Processor 205A may also be in communication with a player tracking device 255A, which may be a component of gaming device 200A. Player tracking device 255A may, in some embodiments, be considered an example of an input device 240A. Player tracking device 255A may, in one or more embodiments, comprise a reader device operable to read information from and/or write information to a card such as a smart card and/or a player tracking card, such that (i) players may be identified, and (ii) various data associated with players may then be determined. For example, previous wagering, coin-in and/or cash-out behaviors previously engaged in by the player may be determined based on information associated with the player identifier. In another example, previous strategies employed in a video poker game may be similarly determined. In yet another example, previous actions taken by a player that may help to identify the player as a potential problem gambler may be associated with the player identifier (e.g., whether the player has previously been identified as a potential problem gambler, whether the player has previously hit or yelled at a gaming device, whether the player has previously attempted to actuate or actuated an input device during an inactive state, etc.). Similarly, a number of cashable credits available to the player may be determined, a number of promotional credits that may not be redeemed for cash but that are associated with the player may be determined, a code or other indication of a benefit to be provided to the player may be determined, a number of accumulated loyalty points associated with the player may be determined, a number of accumulated game elements such as symbols, cards or hands associated with the player may be determined, etc.

In one example, a card reader device comprising a player tracking device 255A may determine an identifier associated with a player (e.g., by reading a player tracking card comprising an encoded version of the identifier), such that the gaming device may then access data (e.g., of a player database, a session database) associated with the player. In another example, a smart card reader device may determine data associated with a player directly by accessing a memory of an inserted smart card.

As described in more detail below, a player database may be used, for example, to store player wager data (e.g., such that players wagering over a given threshold in a given amount of time may be rewarded for their patronage, qualify for certain features, be identified as a potential problem gambler, and so on). The player database may also contain other information that may be useful in, for example, promoting and managing player behaviors (e.g., information about the player's gaming preferences, lodging arrangements, and the like). Further, the player database may store data regarding a given player's standing in a game session and/or a bonus game and/or whether an event has previously been dispatched in response to an identification of the player as a problem gambler. Such player data may be stored in a relational database and retrieved or otherwise accessed by the processor after receiving a "key" data point from the player, such as a unique identifier read from the player's player tracking card or cashout ticket.

In one embodiment, the player tracking device 255A may comprise (i) a card reader (e.g., a port into which player tracking cards may be inserted), (ii) various input devices (e.g., a keypad, a touch-screen), (iii) various output devices (e.g., a small, full-color display screen), and/or (iv) combinations thereof (e.g., a touch-sensitive display screen that accommodates both input and output functions). Various commercially available devices may be suitable for such an application, such as the NextGen™ interactive player tracking panel manufactured by IGT or the iVIEW display screen manufactured by Bally® Gaming and Systems.

As known in the art, "smart cards" may incorporate (i) a memory, and (ii) means for accessing such a memory. For example, in one embodiment, the memory may store data related to aspects of the present invention. In one embodiment, data may be written to the smart card as a player plays one or more gaming devices (e.g., such that various data may be updated on a continuous, periodic or event-triggered bases). Accordingly, in one or more embodiments one or more devices operable to carry out various processes of the present invention (e.g., a gaming device 200A or controller 105A) may have associated therewith a smart card reader device, such that data may be read from the smart card pursuant to the execution of such processes. An example of a smart card system that may be used to implement one or more embodiments of the present invention is the s-Choice™ Smart Card Casino Management System from Smart Card Integrators, Inc.™.

Of course, other non-card-based methods of identifying players are contemplated. For example, a unique identification code may be associated with the player. The player may then be identified upon entering the code. For example, the code may be stored (e.g., within a database maintained within a gaming device 200A or controller 105A) such that the player may enter the code using an input device of a gaming device, and accordingly allow the player to be uniquely identified. In other embodiments, player biometrics may serve as identification means (e.g., a player is identified via a thumbprint or retinal scan of the player). In further embodiments, a barcode of a cashless gaming ticket may encode a player identifier.

Thus, as described, various data associated with a player may be tracked and stored (e.g., in an appropriate record of a centrally-maintained database), such that it may be accessed as desired (e.g., when determining whether the player qualifies as a problem gambler). Further, various statistics may be measured in association with a player (e.g., coin-in statistics, win/loss statistics, buy-in amount for a session) and similarly accessed.

Various systems for facilitating such monitoring of player behavior and activity are contemplated. For example, a two-wire system such as one offered by International Gaming Systems (IGT) may be used. Similarly, a protocol such as the IGT SAS™ protocol or the IGT SuperSAST™ protocol may be used. The SAS™ protocol and the SuperSAST™ protocol each allows for communication between gaming machines and slot accounting systems and provides a secure method of communicating all necessary data supplied by the gaming device to the online monitoring system. One aspect of the SAS™ protocol and the SuperSAST™ protocol that may be beneficial in implementing aspects of the present invention is the authentication function which allows operators and regulators to remotely interrogate gaming devices for important memory verification information, for both game programs, and peripheral devices. In another example, a one-wire system such as the OASIS™ System offered by Aristocrat Technologies™ or the SDS slot-floor monitoring system offered by Bally Gaming and Systems™ may be used. Each of the systems described above is an integrated information system that continually monitors slot machines and customer gaming activity. Thus, for example, any one of these systems may be used to monitor a player's gaming activity in order to determine player outcomes, buy-in amounts, coin-in statistics, win/loss statistics and/or any other data deemed relevant.

In one embodiment, a player may operate a plurality of gaming devices. For example, a player may simultaneously play two side-by-side gaming devices, a player may play one gaming device (e.g. a gaming device) and then continue his gaming session at another gaming device (e.g. a video poker machine), and a player may remotely operate a gaming device, possibly by using a telephone, PDA or other device (i) to transmit commands (directly or indirectly) to the gaming device, such as wager amounts and commands to select certain cards; and/or (ii) to receive output (directly or indirectly) from the gaming device.

In one embodiment, a gaming device may allow a player to play a game of skill rather than a game of chance. Such an embodiment may be more appealing to certain players or may be permitted in areas where it is illegal to gamble on games of chance.

In one embodiment, gaming device 200A may be operable to facilitate downloadable games such that games available for play on gaming device 200A may be stored on a server device (e.g., controller 105A, controller 105B or another dedicated device) and downloaded to the gaming device 200A. In one embodiment, software components of the gaming device 200A may be remotely modified and/or updated by another device (e.g., controller 105A, controller 105B or another device). For example, a payout or probability table stored in the memory of gaming device 200A may be altered, modified or updated remotely, hot fixes may be applied to software stored by the gaming device 200A and/or new versions of software may be downloaded to the gaming device 200A. Similarly, the gaming device 200A may be programmed to retrieve any or all such updates from another device, as appropriate and preferred. Any of the above (e.g., downloading of a game, updating of software, modification of a payout or probability table) may occur, for example, based upon an occurrence of an event (e.g., a scheduled event), an indication being received from qualified casino personnel or other personnel (e.g., a regulator), and/or upon a request from a player. In one embodiment, gaming device 200A may comprise a thin client device controlled be a server device (e.g., controller 105A, controller 105B or another dedicated device).

In one or more embodiments, aspects of the present invention, such as identifying a player as a problem gambler and causing an event to be dispatched in response thereto, may be practiced by replacing and/or augmenting one or more components (e.g., hardware and/or software components) of an existing gaming device. Thus, in one or more embodiments, the invention may be applied as a retrofit or upgrade to existing gaming devices currently available for play within various casinos.

For example, a memory (e.g., computer chip) of the gaming device may be replaced or added, the replacement or additional memory storing a program for instructing the processor of the gaming device to operate in accordance with one or more embodiments. In another example, data output via the gaming device (e.g., graphical and/or textual data displayed on the gaming device) may be replaced or added, the replacement or additional data indicating to a player information relevant to one or more aspects of the present invention.

In a specific example, a gaming device may comprise various electronic components mounted to one or more printed circuit boards (PCBs). Such components may include various hardware described herein, such as a communications port and various controllers of peripheral devices (e.g., a display controller), as well as a memory for storing programming instructions (software) and a processor for carrying out such instructions. Forms of memory that may be found in a gaming device include electronically erasable programmable read-only memory (EEPROM), erasable programmable read-only memory (EPROM) and flash memory. Thus, in one or more embodiments of the present invention, an EPROM storing software with instructions for carrying out aspects of the present invention (as well as instructions for carrying out other functions traditionally performed by the gaming device) may replace an EPROM previously installed in a gaming device or may be reprogrammed in accordance with one or more embodiments described herein, such that the gaming device may be configured to operate in accordance with various processes described herein.

For example, a "problem gambler identification" module may be made available for purchase to various casino operators. The module, which may comprise various hardware and software (e.g., an EEPROM storing software instructions), may be installed in an existing gaming device (e.g., a video-reel slot machine, a video poker machine, etc.), such that when the module is installed, players of the device may elect (i) to play the gaming device in a manner that does not incorporate embodiments described herein, or (ii) to play the gaming device in a manner that incorporates embodiments described herein (e.g., be able to be identified as a problem gambler). Thus, players who are familiar with operating a gaming device may elect to pay for them in a different or similar manner as they are accustomed to.

Similarly, in addition to or in lieu of a player being able to select a mode of operation of the gaming device, in some embodiments a casino operator may be able to do so. For example, a casino operator may be able to select whether the gaming device is to operate in a conventional mode or in a "problem gambler identification" mode.

Accordingly, a gaming device may be configured to allow a player, casino operator or other entity to select one of at least two "modes" of the gaming device, and to enable the selected mode. If a "standard" mode is selected, the gaming device may be configured to operate in a manner similar to how it operated before the installation of the module (e.g., the gaming device operates in a conventional manner, such that embodiments described herein may not be utilized). If a "problem gambler identification" mode is selected, the gaming device may then be operable to execute game play in accordance with one or more embodiments described herein.

In one example of allowing an entity to select one or more modes, a touch-sensitive display screen may be configured to output a prompt to select a mode of operation. Such a prompt may be output in occurrence to various trigger conditions (e.g., coins, bills or tickets are inserted; a credit balance increases from zero to some other number; a player presses a "play" button; a motion, weight, infrared or other sensor detects the presence of a player; the gaming device being turned on, initiated, re-configured and/or rebooted, etc.). Accordingly, an entity may select a mode of operation (e.g., by pressing an appropriately labeled icon of a touch-sensitive display screen), and upon receiving the entity's selection, the gaming device may be configured to operate in the selected mode.

In another embodiment, a gaming device may be operable to automatically determine whether it should switch modes from a standard mode to a "problem gambler identification" mode. A gaming device may perform such a determination, for example, by evaluating data received from a player and/or another device and/or by querying another device. For example, a gaming device may be programmed to determine (e.g., upon receiving a player identifier and based upon the player identifier) whether the player currently playing the gaming device qualifies as a problem gambler.

In one embodiment, a gaming device may be operable to output an indication that it is currently in "problem gambler identification" mode (e.g., to inform a player that the current play of the gaming device may result in the player being identified as a potential problem gambler). For example, the gaming device may turn on a light, change graphics, output a sound, etc.

In other embodiments, as described herein, a peripheral device may be useful for implementing one or more embodiments of the present invention into the operation of a conventional gaming device. For example, in order to avoid or minimize the necessity of modifying or replacing a program already stored in a memory of a conventional gaming device, an external or internal module that comprises a peripheral device may be inserted in, connected to or otherwise associated with the gaming device. Such a peripheral device may be operable to, for example, monitor and/or transmit information about a player's gambling activity at the gaming device to another device (e.g., controller 105A). The peripheral device may monitor and/or transmit such information to enable a determination of whether a player qualifies as a problem gambler.

In still further embodiments, rather than configure existing gaming devices to execute embodiments described herein by installing or connecting new hardware and/or software, software may be downloaded into an existing memory of one or more gaming devices. U.S. Pat. No. 6,805,634 to Wells et al. teaches methods for downloading data to gaming devices in such a manner. The entirety of U.S. Pat. No. 6,805,634 is incorporated by reference herein for all purposes. Thus, in some embodiments, an existing gaming device may be reprogrammed to accommodate new functionality of the present invention without the need, or by minimizing the need, to remove and replace hardware within the gaming device.

Figure 2B:
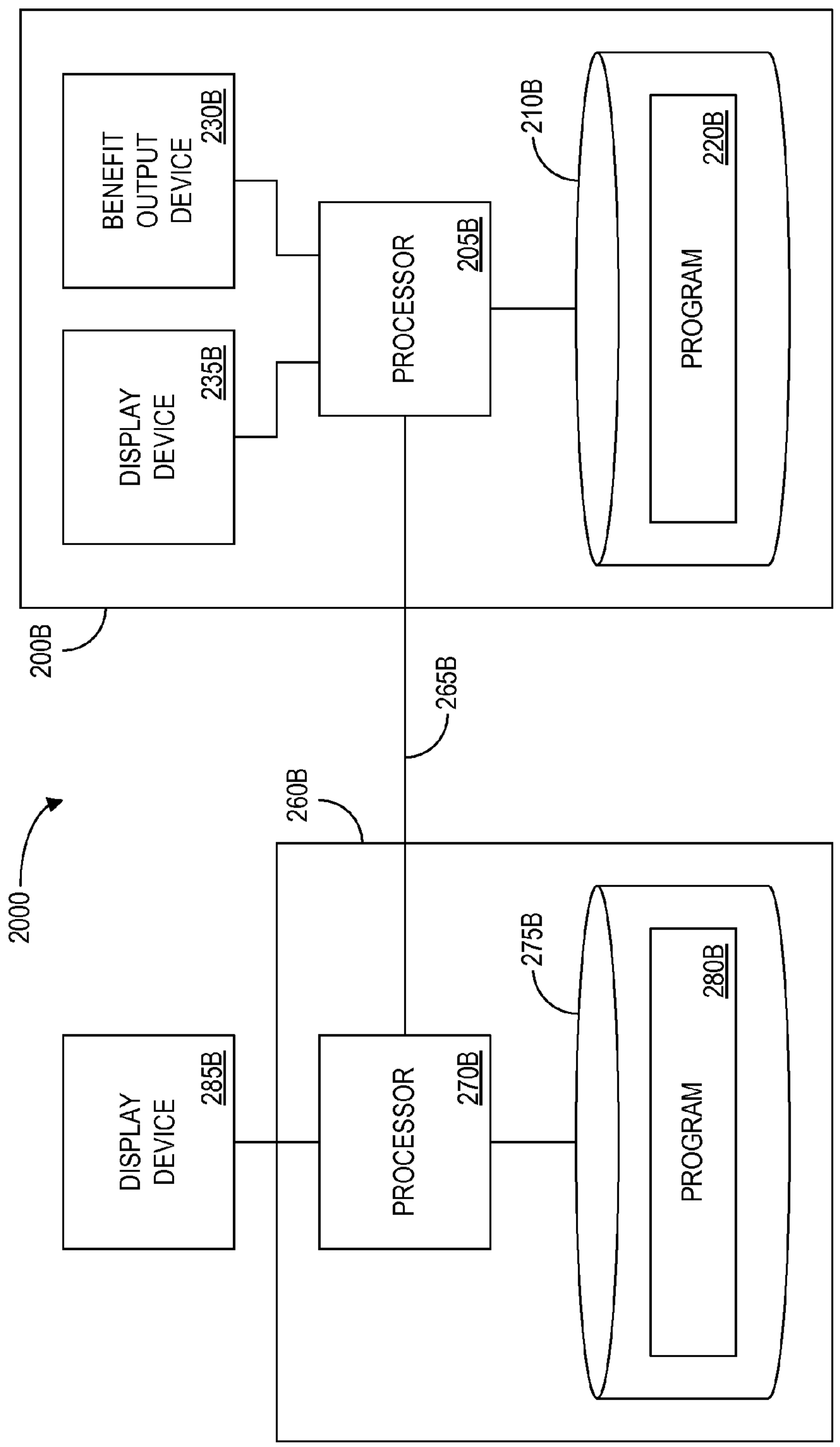
FIG. 2B is a block diagram of an example embodiment of a gaming device and a block diagram of an example embodiment of a peripheral device, wherein the gaming device and the peripheral device are in communication with one another, in accordance with at least one embodiment.

Referring now to FIG. 2B, illustrated therein is a block diagram of an example embodiment 2000 of an apparatus that comprises a gaming device 200B in communication with a peripheral device 260B, in accordance with some embodiments described herein. Embodiment 2000 is referred to as apparatus 2000 herein. The gaming device 200B may communicate with the peripheral device 260B over a network 265B. Communication between the gaming device 200B and the peripheral device 260B may be direct or indirect, such as over the Internet through a Web site maintained by a computer on a remote server or over an on-line data network including commercial on-line service providers, bulletin board systems and the like. In yet other embodiments, any and all of the devices of apparatus 2000 may communicate with one another over RF, cable TV, satellite links and the like.

Some, but not all, possible communication networks that may comprise network 265B or otherwise be part of system 2000 include: a local area network (LAN), a wide area network (WAN), the Internet, a telephone line, a cable line, a radio channel, an optical communications line, a satellite communications link. Possible communications protocols that may be part of system 2000 include: Ethernet (or IEEE 802.3), SAP, ATP, Bluetooth™, and TCP/IP. Communication may be encrypted to ensure privacy and prevent fraud in any of a variety of ways well known in the art.

The gaming device 200B may be similar to gaming device 200A (FIG. 2A) and thus include many of the same or similar components and functionality. However, some of the functionality described as being performed by gaming device 200A may not be performed by (or may not exclusively be performed by) gaming device 200B but may instead or in addition be performed by peripheral device 260B. For example, one or more of the following may be performed by peripheral device 260B (alone or working in cooperation with gaming device 200B):

(i) determining that a player of gaming device 200B has actuated or attempted to actuate an input device of the gaming device 200B during an inactive state of the input device;

(ii) determining that a player of gaming device 200B has selected or attempted to select a feature or option of the gaming device that is unavailable to the player;

(iii) analyzing one or more actions or behavior patterns of a player of gaming device 200B to determine whether a player may require attention as a problem gambler;

(iv) transmitting an indication of one or more actions or behavior patterns of a player of gaming device 200B to another device (e.g., for determination of whether the player qualifies as a problem gambler);

(v) dispatching an event upon determining that a player of gaming device 200B qualifies as a problem gambler; and (vi) outputting a message to a player of gaming device 200B, the message targeted at curbing inappropriate gambling behavior of a player determined to be a problem gambler.

Peripheral device 260B is an example embodiment of a peripheral device 130B (FIG. 1B). Peripheral device 260B comprises a processor 270B in communication with an output device 285B and a memory 275B. In some embodiments, the peripheral device 130B may comprise a device operable to facilitate a table game (e.g., a device operable to monitor a blackjack game, such as size of a player's wager, cards received and/or decisions made).

Output device 285B may comprise, for example, a display device similar to display device 235A (FIG. 2A) and/or a speaker or other type of device operable to output information. Processor 270B may be similar to processor 205A (FIG. 2A) and thus the above description of processor 205A applies to processor 270B.

The memory 275B may be similar to the memory 210A (FIG. 2A) and thus the description of the memory 210A applies to the memory 275B. The memory 275B stores a program 280B for controlling the processor 270B. The processor 270B performs instructions of the program 280B, and thereby operates in accordance with one or more embodiments described herein, and particularly in accordance with the methods described in detail herein. The description of program 220A applies to program 280B, thus program 280B need not be described in detail herein. Although not shown, the memory 275B may store one or more databases, such as a dispatched events database (described below and shown as also possibly being stored in a controller 300 (FIG. 3)). As described with respect to gaming device 200A, a database or list of events, actions, or patterns of a player may also be stored in memory 275B, for determining whether an indication should be sent to another device and/or for determining whether a player may require attention as a problem gambler.

Gaming device 200B need not be described in detail herein. It is sufficient to say that gaming device 200B may include some or all of the same components as gaming device 200A (as illustrated in FIG. 2B), which may function in the same manner as described with respect to FIG. 2A.

Figure 3:
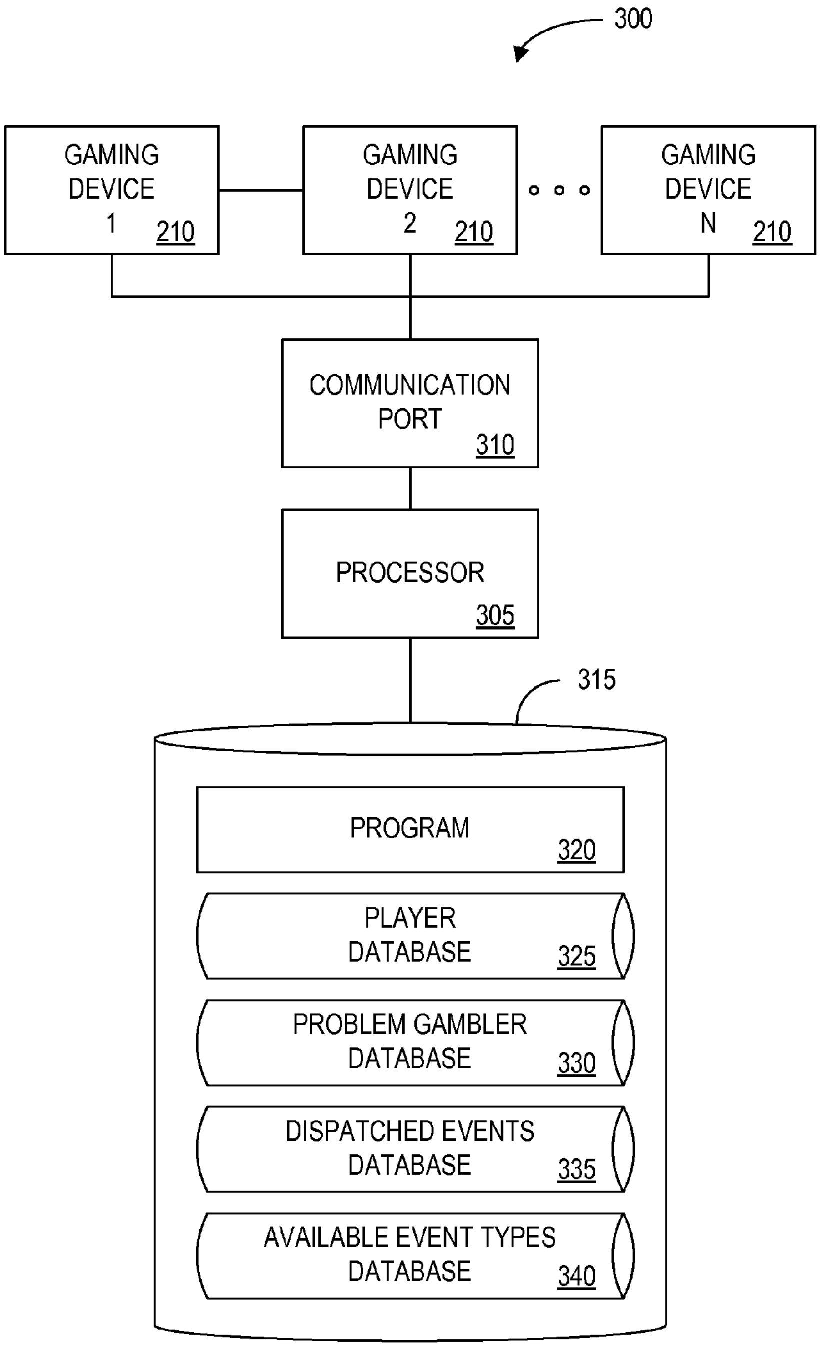
FIG. 3 is a block diagram of an example embodiment of a server device, also referred to as a controller herein, in accordance with at least one embodiment.

Referring now to FIG. 3, illustrated therein is an embodiment 300 of a controller operable to communicate with one or more gaming devices 210. Although three gaming devices 210 are illustrated, any number may be used. A gaming device 210 may comprise, for example, a gaming device 110A or a gaming device 110B. The embodiment 300 may be, for example, an embodiment of the controller 105A and/or an embodiment of the controller 105B. Embodiment 300 is referred to as controller 300 herein. It should be noted that controller 300 may comprise a server device operable to communicate with one or more gaming devices, as the term is used herein.

The controller 300 may be implemented as a system controller, a dedicated hardware circuit, an appropriately programmed general-purpose computer, or any other equivalent electronic, mechanical or electro-mechanical device. The controller 300 may comprise, for example, one or more server computers operable to communicate with one or more client devices, such as one or more gaming devices, one or more kiosks, one or more peripheral devices, and/or one or more casino personnel devices. The controller 300 may be operative to manage the system 100A and/or the system 100B (or portions of one or both systems) and to execute some or all of the methods described herein.

In operation, the controller 300 may function under the control of a casino, another merchant, or other entity that may also control use of the gaming devices 110A and/or the gaming devices 110B. For example, the controller 300 may be a slot server in a casino. In some embodiments, the controller 300 and a slot server may be different devices. In some embodiments, the controller 300 may comprise a plurality of computers operating together. In some embodiments, the controller 300 and a gaming device may be the same device.

The controller 300 comprises a processor 305, such as one or more Intel® Pentium® processors. The processor 305 is in communication with a communication port 310 (e.g., for communicating with one or more other devices, such as one or more gaming devices 110A and/or one or more gaming devices 1106) and a memory 315. The memory 315 may comprise an appropriate combination of magnetic, optical and/or semiconductor memory, and may include, for example, Random Access Memory (RAM), Read-Only Memory (ROM), a compact disc and/or a hard disk. The processor 305 and the memory 315 may each be, for example: (i) located entirely within a single computer or other device; or (ii) connected to each other by a remote communication medium, such as a serial port cable, telephone line or radio frequency transceiver. In one embodiment, the controller 300 may comprise one or more devices that are connected to a remote server computer for maintaining databases.

The memory 315 stores a program 320 for controlling the processor 305. The processor 305 performs instructions of the program 320, and thereby operates in accordance with the present invention, and particularly in accordance with the methods described in detail herein. The program 320 may be stored in a compressed, uncompiled and/or encrypted format. The program 320 furthermore includes program elements that may be necessary, such as an operating system, a database management system and "device drivers" for allowing the processor 305 to interface with computer peripheral devices. Appropriate program elements are known to those skilled in the art, and need not be described in detail herein. The program 320 may include computer program code that allows the controller 300 to employ the communication port 310 to communicate with a gaming device (e.g., gaming device 400, described below) in order to, for example:

1. track gambling or other activity performed at the gaming device;
2. track gaming or other activities of individual players;
3. track movement and/or facial expressions of a player at a gaming device;
4. determine any sound emitted by a player of a gaming device;
5. determine whether a player qualifies as a problem gambler or potential problem gambler;
6. dispatch an event if a player qualifies as a problem gambler or potential problem gambler;
7. instruct a gaming device to perform one or more functions (e.g., output a message to a player, interrupt play, etc.);
8. determine whether a player currently playing a gaming device has previously been identified as a problem gambler or potential problem gambler;
9. assign or otherwise determine a unique identifier for a player who has been identified as a problem gambler or potential problem gambler;
10. receive an input from a casino employee regarding a player who has been identified as a problem gambler or potential problem gambler (e.g., an input indicative of the employee's interaction with the player);
11. controlling (e.g., preventing or regulating) access to stored funds and/or a credit line; and/or
12. direct a device (e.g., a security camera in the casino, a camera of a gaming device, a camera of a peripheral device, etc.) to focus on a particular player who has been identified as potentially a problem gambler.

According to an embodiment, the instructions of the program 320 may be read into a main memory from another computer-readable medium, such from a ROM to RAM. Execution of sequences of the instructions in program 320 causes processor 305 to perform the process steps described herein. In alternate embodiments, hard-wired circuitry may be used in place of, or in combination with, software instructions for implementation of the processes of the present invention. Thus, embodiments of the present invention are not limited to any specific combination of hardware and software.

The memory 315 also stores (i) a player database 325; (ii) a problem gambler database 330; (iii) a dispatched events database 335; and (iv) an available event types database 340. Each of the databases 325 through 340 is described in more detail below.

In some embodiments (e.g., in an embodiment in which controller 300 manages downloadable games playable on one or more gaming devices), the memory 310 may store additional databases. Examples of such additional databases include, but are not limited to, (i) a gaming device database that stores information related to one or more gaming devices with which the controller 300 is operable to communicate, (ii) a game database that stores information regarding one or more games playable on and/or downloadable to one or more gaming devices, and (iii) a scheduling and/or configuration database useful for determining which games are to be made available on which gaming devices.

Similarly, in one embodiment controller 300 may be operable to configure a gaming device remotely, update software stored on a gaming device and/or to download software or software components to a gaming device. For example, controller 300 may be operable to apply a hot fix to software stored on a gaming device, modify a payout and/or probability table stored on a gaming device and/or transmit a new version of software and/or a software component to a gaming device. Controller 300 may be programmed to perform any or all of the above functions based on, for example, an occurrence of an event (e.g., a scheduled event), receiving an indication from a qualified casino employee and/or other person (e.g., a regulator) and/or receiving a request from a player.

Although the databases 325 through 340 are described as being stored in a memory of controller 300, in other embodiments some or all of these databases may be partially or wholly stored, in lieu of or in addition to being stored in a memory of controller 300, in a memory of one or more other devices. Such one or more other devices may comprise, for example, one or more peripheral devices, one or more gaming devices, a slot server (if different from the controller 300), another device, or a combination thereof. Further, some or all of the data described as being stored in the memory 315 may be partially or wholly stored (in addition to or in lieu of being stored in the memory 315) in a memory of one or more other devices. Such one or more other devices may comprise, for example, one or more peripheral devices, one or more gaming devices, a slot server (if different from controller 300), another device, or a combination thereof.

Various databases that may be useful in one or more embodiments will now be described. Example structures and sample contents of the (i) a player database 325; (ii) a problem gambler database 330; (iii) a dispatched events database 335; and (iv) an available event types database 340 are shown in FIGS. 4A and 4B-7, respectively. The specific data and fields illustrated in these drawings represent only some embodiments of the records stored in the databases described herein. The data and fields of these databases can be readily modified, for example, to include more or fewer data fields. A single database also may be employed. Note that in the databases, a different reference numeral is employed to identify each field of each database. However, in at least one embodiment, fields that are similarly named (e.g., player identifier fields) may store similar or the same data in a similar or in the same data format.

Example embodiments of the databases 325, 330, 335 and 340 are described in detail below and example structures are depicted with sample entries in the accompanying figures. As will be understood by those skilled in the art, the schematic illustrations and accompanying descriptions of the sample databases presented herein are exemplary arrangements for stored representations of information. Any number of other arrangements may be employed besides those suggested by the tables shown. For example, even though four separate databases are illustrated, the invention could be practiced effectively using one, two, three, five or more functionally equivalent databases. Similarly, the illustrated entries of the databases represent exemplary information only; those skilled in the art will understand that the number and content of the entries can be different from those illustrated herein. Further, despite the depiction of the databases as tables, an object-based model could be used to store and manipulate the data types of the present invention and likewise, object methods or behaviors can be used to implement the processes of the present invention.

It should also be noted that some or all of the data or types of data illustrated in FIGS. 4A-7 may be stored and managed in individual ones of the gaming devices 110A or 110B and may be used therein to manage, control and/or monitor events at the one or more gaming devices.

Referring now to FIG. 4A and FIG. 4B, illustrated therein is a tabular representation of an example embodiment 400 of a player database. Embodiment 400 is referred to as player database 400 herein. A player database 400 may be stored in a memory of a device (e.g., memory 315 of controller 300 and/or memory 210A of gaming device 200A) in tabular form, or any other appropriate database form, as is well known in the art. The data stored therein may include a number of exemplary records or entries, including records R700-1 through R700-4, each defining a player. Those skilled in the art will understand that the player database 400 may include any number of entries.

The player database 400 may also define fields for each of the entries or records. The fields specify: (i) a player identifier field 405 that (e.g., uniquely) identifies a player; (ii) a name field 410 that indicates a name of the player; (iii) an address field 415 that indicates contact information associated with the player (e.g., a postal address, an e-mail address, a telephone number, a pager number or other information allowing the player to be contacted); (iv) a player since field 420 that indicates a date at which a player became a member of a casino slot club or otherwise began to be tracked by a casino or other entity; (v) a total wagered field 425 that indicates an aggregate amount that the player has wagered within a predefine period of time, or that the player has deposited in a gaming device or made available for wagering at a gaming device within a predefined period of time (e.g., since the player's wagers began to be tracked, during a current visit to a casino, within a current year, etc.), (vi) a theoretical win field 425 that indicates a theoretical win associated with the player for a predefined period of time; (vii) a problem gambler status field 430 that indicates a status of the player with respect to a problem gambler designation; and (viii) a problem gambler score 435, if any, that is associated with the player.

Of course, the player database may include different and/or additional fields that store information such as, for example, (i) a financial account identifier of the player, which may be, e.g., a credit card, debit card or checking account number; (ii) demographic data about the player, such as the age, gender, income level of the player; (iii) credits and/or complimentary points which the player has accumulated in one or more previous and current plays at one or more gaming devices; and/or (iv) an indication of a behavioral pattern of the pattern (e.g., frequent gambler, weekend gambler, maximum wager gambler on high denomination machines, play until credit balance zero gambler, etc.).

A device (e.g., a controller 300 and/or gaming device 400) may utilize a player database 400 to determine, for example, whether a player has previously been identified as potentially requiring attention as a problem gambler (e.g., based on a problem gambler status associated with the player and/or a problem gambler score associated with the player). For example, once a player inserts a player tracking card into a gaming device, the player identifier of the player tracking card may be utilized to determine whether the player qualifies as a problem gambler and/or what problem gambler score, if any, is associated with the player. It should be noted that, in some embodiments, a player identifier may comprise a picture or image of the player. Thus, a player currently playing a gaming device may be associated with a previously created record in a player database by capturing an image of the player and comparing the image to images stored in the player database. If the image matches an image of a record in the player database, it may be determined that the data of that record is, at least likely, to be data associated with the player currently playing the gaming device.

The data stored in the problem gambler status field 430 may comprise, for example, an indication of whether the corresponding player has been identified as a problem gambler or as potentially requiring attention as a problem gambler. In some embodiments, such a status may indicate the certainty with which a player has been identified as a problem gambler (e.g., "potential", "maybe", "somewhat", confirmed", etc.). Such a status may, in some embodiments, be indicated as a number, phrase, sign, or in another form. In some embodiments, such a status may be entered by casino personnel. In some embodiments, such a status may be entered by a device, based on a determination or analysis of one or more actions of the player. In some embodiments, a player status may change as more information is obtained about the player (e.g., a player status may change from "Yes" to "Potential" to "No" or in another order). In some embodiments, the status of a player as a problem gambler may be made available or known to a player while in other embodiments, such a status may be kept confidential from the player.

The data stored in the problem gambler score field 435 may be a numerical representation of a score calculated based on one or more actions of the corresponding player, the score being usable to determine whether the player is considered to be a problem gambler, a probably or possible problem gambler, or not a problem gambler. For example, as will be described in more detail with respect to FIG. 10, in one embodiment a score that represents a likelihood that a player is a problem gambler may be determined for a player (e.g., for each player whose activities are being tracked by a casino). Thus, as is described in more detail below, in one embodiment certain actions or behavioral patterns may be associated with respective amounts of points and the points may be added together as the player's activities and behavioral patterns are tracked. The sum of the points may be considered the player's problem gambler score. Such a score may be compared to a plurality of ranges or thresholds. For example, if a player's problem gambler score is equal to or greater than a first amount of points, the player may be considered as a potential problem gambler or borderline problem gambler. If a player's problem gambler score is equal to or greater than a first amount of points that is greater than the first amount of points, the player may be considered to very likely be a problem gambler. If the player's problem gambler score is equal to or greater than a third amount of points that is greater than the second amount, the player may be considered to potentially be an extreme problem gambler. In some embodiments, different events may be dispatched based on a player's problem gambler score. For example, a player may only be prevented from gambling or gambling on certain games, devices or in certain denominations if the player's score indicates that the player is an extreme problem gambler. Such different levels or grades of events are described in more detail below.

It should be noted that, in some embodiments, a player's problem gambler score may be decreased in response to certain events. For example, if a player does not perform any actions that indicate the player is a problem gambler for a certain period of time (e.g., one year), the player's problem gambler score may be decreased by a predetermined amount. Similarly, if a player exhibits certain desirable behavior or performs certain actions that indicate the player is engaging in healthy gambling activity (e.g., only wagering small amounts during each gambling session, cashing out after a big win and not risking the big win, etc.), the player's problem gambler score may be decreased in response. A more detailed description of what types of actions and/or behavioral patterns may effect a player's problem gambler score is provided below with respect to FIG. 10. Similarly, a more detailed description of what types of events may be dispatched based on a player's problem gambler score are described in more detail below with respect to FIG. 10.

In some embodiments, information stored in a player database may be used to manage or effect a player's experience in a casino. For example, if a player is associated with a problem gambler status of "Yes" or "extreme", the player's gambling activity may be more carefully monitored than it otherwise would be, or a player may be prevented from gambling at certain times, for more than a certain amount of time, from wagering more than a certain amount within a given period of time, from wagering more than a certain denomination, from wagering on certain gambling activities, etc.

Figure 5:
FIG. 5 is a table illustrating an example structure and example data for a problem gambler database, in accordance with at least one embodiment.

Referring now to FIG. 5, illustrated therein is a tabular representation of an example embodiment 500 of a problem gambler database 330. Embodiment 500 is referred to as problem gambler database 500 herein. A problem gambler database 500 may be stored in a memory of a device (e.g., memory 315 of controller 300 and/or memory 210A of gaming device 200A) in tabular form, or any other appropriate database form, as is well known in the art. The data stored therein may include a number of exemplary records or entries, each storing information on a player identified as a problem gambler or potential problem gambler. Those skilled in the art will understand that the problem gambler database 500 may include any number of entries.

The problem gambler database 500 may be utilized, for example, to track information related to players identified as problem gamblers. For example, events dispatched in relation to the players may be stored. In some embodiments, an intrusiveness level of a dispatched event may be increased over time, as a player continues to require attention as a problem gambler and events continue to be dispatched due to this status of the player as a problem gambler. For example, in one embodiment, when a player is first identified as a problem gambler, a casino employee may approach the player and passively engage the player in conversation, the conversation not being directed to confronting the player about this problem gambling but rather intended to distract the player from his problematic gambling behavior. This may be considered to be a relatively un-intrusive interaction with the player. However, if such passive interventions by a casino employee appear to have no effect and the player continues to be identified as a problem gambler, a more intrusive event may be dispatched, such as outputting a problem gambler questionnaire to the player. In extreme circumstances, a player may be prevented from gambling (e.g., a gaming device may be directed to lock-up, shut-down or otherwise not allow a player to wager thereon).

Accordingly, it may be desirable to track information related to players identified as problem gamblers, such as the events dispatched to the player. For example, a determination of what event to dispatch with respect to a player may at least partially be performed based on prior events that have been dispatched with respect to the player and/or the success of each of such events (e.g., did the player's gambling behavior improve, did the player's problem gambler score improve after the prior event was dispatched?).

The problem gambler database 500 may define fields for each of the entries or records. The fields may specify: (i) problem gambler identifier 505 that identifies (e.g., uniquely) a problem gambler or potential problem gambler; (ii) a date identified field 510 that indicates a date on which a player has been identified as a problem gambler or potential problem gambler (in some embodiments, an indication of what player action(s) and/or behaviors caused the player to be identified as a problem gambler may also be stored); (iii) a dispatched events field 515 that stores an indication or description of an event that has been dispatched with respect to the player (in some embodiments, this may be an identifier that corresponds to a description in another database); and (iv) a current status field 520 that indicates the player's current status as to whether the player is considered a problem gambler and/or what events or actions are to be taken with respect to the player's problem gambler status. For example, as indicated in the first record, the current status of player "P-000001" indicates that the player is to be prevented from placing wagers greater than or equal to $X. In another example, the second record of the database indicates that the player "Nora Smith" is to continue receiving low-grade interaction (i.e., events that are relatively not intrusive or aggressive are to be dispatched with respect to this player). As described below, in some embodiments events may be categorized into levels, each level corresponding to a different level of intrusiveness or aggressiveness. In such embodiments, the current status field 520 may store an indication of the level of event to be dispatched with respect to the player.

It should be noted that players who are not members of a slot player club or loyalty program of a casino (or who choose not to identify themselves as such) may still be identified as problem gamblers and their activities tracked and events dispatched to them over the course of different gambling sessions. For example, in one embodiment an image of a player may be captured and stored, the image serving to identify the player for future use. The second record in the database illustrates such a player. It should be noted that the player is further identified by a name; "Nora Smith." However, in other embodiments there may be no name associated with a player, or at least not initially. For example, when a player is first identified as a problem gambler, there may be no need to further identify the player by name. For example, a casino employee may be dispatched to approach a player without needing to know the name of the player (e.g., the casino employee may be directed to a particular gaming device and a camera or sensor in a seat associated with the gaming device may be used to confirm that the player playing the gaming device at the time of the casino employee's approach is the same player who's actions triggered the casino employee to be dispatched). However, if the player continues to be identified as a problem gambler and/or the player's gambling behavior becomes more inappropriate (e.g., causing the player's problem gambler score to increase), further identifying information about the player (e.g., a name) may be desirable. Such information may be obtained, for example, by a casino employee who is dispatched to interact with the player.

Of course, other information besides that illustrated may be stored in a problem gambler database. For example, a problem gambler score may be stored in the problem gambler database (e.g., in lieu of or in addition to being stored in a player database). In another example, notes regarding a casino employee's interactions with the problem gambler may be stored (e.g., how did player react). In another example, an indication of a success of an event that was dispatched with respect to the player may be stored. For example, an event may be considered successful if it caused the player to take a break from gambling, improve his problem gambling behavior (e.g., during the current play session and/or over a more extended period of time) and/or if a player expresses a positive reaction to the event (e.g., the player tells a casino employee "thank you, I didn't realize I was behaving in that manner").

Referring now to FIGS. 6A and 6B, illustrated therein is a tabular representation of an example embodiment 600 of dispatched events database 335. Embodiment 600 is referred to as dispatched events database 600 herein. A dispatched events database 600 may be stored in a memory of a device (e.g., memory 315 of controller 300 and/or memory 210 of gaming device 200A) in tabular form, or any other appropriate database form, as is well known in the art. The data stored therein may include a number of exemplary records or entries, including records R600-1 through R600-4, each defining an event that was dispatched upon determining that a player may require attention as a problem gambler or that a problem gambler is exhibiting problem gambling behavior. Those skilled in the art will understand that the dispatched events database 600 may include any number of entries.

The dispatched events database 600 may be utilized, for example, to track an event that has been dispatched (e.g., whether the event has been completed, the feedback, if any, regarding the event). The dispatched events database 600 may define fields for each of the entries or records. The fields may specify: (i) a dispatched event identifier 605 that (e.g., uniquely) identifies an event that has been dispatched; (ii) an event description 610 that described (e.g., in human and/or machine readable form) the corresponding event; (iii) a time of dispatch 615 that indicates a time at which the corresponding event was dispatched; (iv) a time of completion 620 that indicates a time at which the corresponding event was completed; (v) a player identifier 625 that identifies (e.g., uniquely) the player associated with the dispatched event (note that in some circumstances the identifier may be an image and in other circumstances no identifier may be needed or preferred); and (vi) a feedback field 625 that stores an indication of feedback (e.g., from a casino employee, player, and/or device associated with the event) regarding the player's response to the event.

Referring now to FIG. 7, illustrated therein is a tabular representation of an example embodiment 700 of an available event types database 340. Embodiment 700 is referred to as available event types database 700 herein. An available event types database 700 may be stored in a memory of a device (e.g., memory 315 of controller 300 and/or memory 210 of gaming device 200A) in tabular form, or any other appropriate database form, as is well known in the art. The data stored therein may include a number of exemplary records or entries, including records R700-1 through R700-5, each defining a type of event that is available for dispatch. For example, the available event types database 700 may be accessed to determine an event to be dispatched with respect to a player upon determining that the player qualifies as a problem gambler.

It may be helpful to contrast an example use of the information stored in database 700 with an example use of the information stored in database 600. The information stored in the available event types database 700 may be accessed and a type of event selected (e.g., based on an output rule, as described below). A particular event or instance of an event may then be dispatched, the particular event or instance of event being based on the event type selected. A record may be opened in the dispatched events database 600, to track the dispatched event.

The available event types database 700 may define fields for each of the entries or records. The fields may specify: (i) an event type identifier 705 that identifies the type of event that is available for dispatch; (ii) an event type description 710 that describes the corresponding type of event (e.g., in machine and/or computer readable form); (iii) an event level 715 that indicates an intrusiveness or aggressiveness level of the type of event (e.g., in some embodiments, an intrusiveness level may be determined and a type of event selected based on this determination); (iv) an output rule 720 that indicates a rule based on which the corresponding type of event may be output. In some embodiments, the event level information and the problem gambler score information may be redundant, as the event level may be an indication of a corresponding problem gambler score or range of scores.

It should be noted that in the example embodiment illustrated in database 700, a type of event is output based on the satisfaction of a rule that specifies a range of problem gambler scores. That is, a problem gambler score may be determined for a player and an event type may be selected based on this score. In other embodiments, however, a type of event may be selected based on additional or different output rules. For example, a particular type of action or behavior on the part of a player may be associated with a particular type of event to be dispatched. In another example, the one or more events previously dispatched with respect to a player may be a factor in determining what type of event to select for a current dispatch.

It should further be noted that, in some embodiments, the event description field 710 may include a computer-readable file or pointer to a computer-readable file. For example, in some embodiments dispatching an event may comprise outputting a questionnaire or other information to a player via a device (e.g., a gaming device). In such embodiments, the event description field may store the file comprising the questionnaire or other information.

Figure 8:
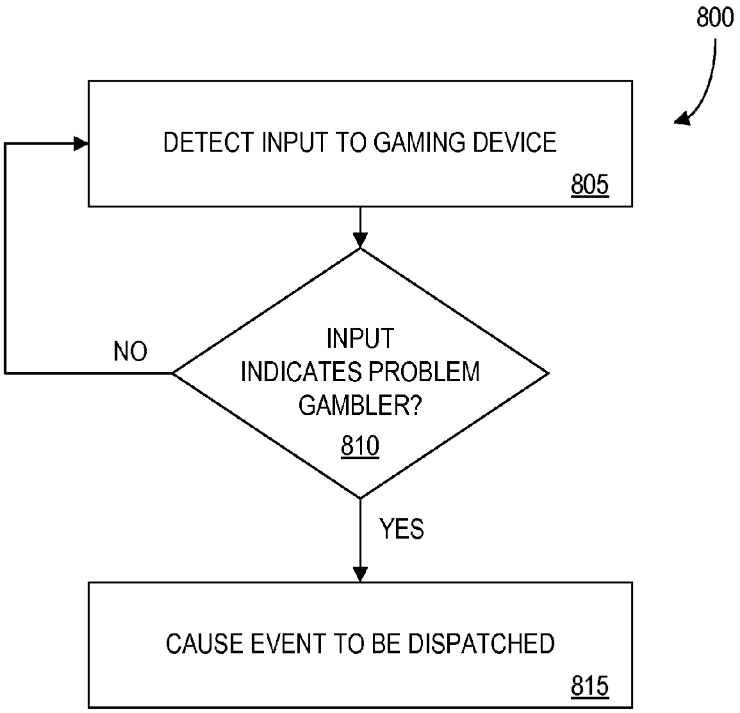
FIG. 8 is a flowchart illustrating a process in accordance with one or more embodiments.

Referring now to FIG. 8, illustrated therein is a process 800 that is consistent with one or more embodiments described herein. Process 800 (and any other process described herein) may be performed, for example, by a controller 105A, a controller 105B, a peripheral device 130B, a peripheral device server 135B, one or more gaming devices 110A, one or more gaming devices 1106, another device or a combination thereof. It should be noted that, as with all processes described herein, one or more of the steps of the process may be performed by a first device (e.g., a controller 105A) while another of the steps may be performed by a second device (e.g., a gaming device 110A). In accordance with one or more embodiments, process 800 may be characterized as a process for determining whether a player qualifies as a problem gambler based on an input provided by a player and dispatching an event in the case of an affirmative determination.

In step 805, an input to a gaming device is determined or detected. For example, a processor of a gaming device may receive a signal from a sensor of a gaming device, the signal indicating an input from a player. For example, a sensor may comprise one or more sensors for determining player aggression or other problematic behavior towards a gaming device. Such one or more sensors may comprise, for example, a tilt sensor for determining that the gaming device has been tilted or shaken, a pressure sensor for determining that the gaming device has been hit or struck by the player, a camera for capturing images of the player and/or a microphone for determining that the player has yelled, cursed, or uttered concerning statements towards the gaming device. For example, player mutterings of prayers or phrases indicating player panic or desperation to win may be detected by a microphone and analyzed by a voice recognition module associated with the gaming device and in communication with a processor of the gaming device. In another example, a player hitting a gaming device, crying at seeing a losing outcome or becoming pale or sweating may be captured by a camera of a gaming device and analyzed by an image analysis module of the gaming device in communication with a processor of the gaming device.

In one example, a player input may comprise an input of a player identifier.

In one embodiment (e.g., an online casino embodiment), an input may comprise an input to a computer terminal (e.g., speed of mouse clicks, speed of keystrokes on a keyboard, selections of icons on a Web site, etc.).

In one embodiment, step 805 may comprise detecting that a button (e.g., a mechanical, electro-mechanical or "soft" button) has been actuated by a player or that a player has attempted to actuate such a button. For example, it may be determined that a player of a gaming device has actuated a reel starting button of a reeled slot machine or a deal button of a video poker machine. In another example, step 805 may comprise determining that a player has actuated a cash-out button of the gaming device. In one embodiment, step 805 may comprise determining a player has activated or selected, or attempted to activate or select, a mechanism or input device of a gaming device other than a button. For example, it may be determined that a player has pulled on a reel starting handle or arm of the gaming device.

In some embodiments, step 805 may comprise determining that a player has actuated an input device of a gaming device during an inactive state of the input device. An inactive state of an input device may comprise a state or time during which actuating or selection of the input device does not trigger or cause the action, event, subroutine or response otherwise triggered by the actuation or selection of the input device. For example, while the reels of a reeled slot machine are spinning, the reel starting mechanism of the gaming device may not be used or operable to start the spinning of the reels and thus the reel spinning mechanism may be considered to be in an inactive state while the reels are spinning. In another example, a new hand deal button of a video poker device may be inoperative to cause a new initial hand to be dealt while a previously dealt hand is being resolved (i.e., prior to a display of a final hand for a previously dealt initial hand) and thus may be considered to be in an inactive state until the previously dealt hand is resolved. It should be noted that an input device may be considered to be in an inactive state even if the actuation or selection of the input device during the inactive state causes some response or action from the gaming device (e.g., an output of a message, such as "action currently not authorized"), so long as the response or action is not the primary one normally associated with use of the gaming device.

In some embodiments, step 805 may comprise determining that a player has selected or attempted to select an option or feature of a gaming device that is currently unavailable to the player (e.g., due to an insufficient credit meter balance). For example, it may be determined that the player has attempted to select the "all paylines, max bet" option when the player does not have sufficient credits in the credit meter balance to fund such a bet.

In some embodiments, step 805 may comprise determining that a player has persistently or repeatedly (e.g., more than a predetermined number of times during a predetermined unit of time) attempted to actuate an input device during an inactive state of the gaming device, attempted to select a feature unavailable to the player, or performed another action being monitored for or otherwise determined. For example, step 805 may comprise determining that a player (e.g., for all game plays, most game plays or a certain percentage of game plays), attempts to spin the reels of a reeled slot machine before the reels have stopped spinning from a previously initiated game play (e.g., the player keeps tapping the reel spin button almost continuously). Applicants have recognized that a player who engages in this type of persistent activity may be a problem gambler (e.g., because the player is so anxious to keep gambling that he or she does not even have the patience to wait and see the outcome of a game play before wanting to start another game play).

In one embodiment, step 805 may comprise determining an amount of force or relative amount of force used to actuate or select an input device or to provide an input to the input device. For example, it may be determined that a player's force in using an input device is of at least a predetermined magnitude. In a more particular example, it may be determined that a player has hit a reel spin button with a concerning amount of force. In such embodiments, an input device may have associated therewith a sensor for determining the relative amount of force used to manipulate, select, actuate or otherwise use the input device. In one embodiment, a change in the amount of force used by a player to actuate, select or otherwise operate a gaming device may be determined (e.g., as compared to an amount of force previously used by a player). An increasing amount of force may be an indication that the player is highly emotional about the play of the gaming device and may be a sign of a problem gambler.

In step 810, it is determined whether the input determined or detected in step 805 indicates that a player associated with the input qualifies as a problem gambler or potentially qualifies as a problem gambler. This step may comprise, for example, an analysis of data associated with the player. For example, the input determined in step 805 may be analyzed alone or in combination with other data associated with the player. In one embodiment, the other data may be data obtained during a current gambling session. For example, if it is determined in step 805 that a player has attempted to start the reels of a reeled slot machine before the reels have stopped spinning from a previously initiated game play, step 810 may include determining whether the player has previously attempted to do the same thing during a current gambling session and, in some embodiments, determining how often a player has attempted to do this during the current gambling session. For example, a device (e.g., a gaming device 110A or a gaming device 110B) may be programmed with logic to determine whether a player qualifies as a problem gambler by analyzing data associated with the player, which data may include an input provided by the player to the gaming device. For example, the gaming device may be programmed to determine that if the player attempts to spin the reels prior to the reels having stopped spinning more than once every five (5) game plays, the player qualifies as a problem gambler. Many other such logic rules may be programmed into a gaming or other device, for determining whether a player qualifies as a problem gambler based on an input provided by the player to a gaming device. Some examples, not to be taken in any limiting fashion, are provided below.

(i) player attempts to select a wager amount for which the player does not qualify due to insufficient funds for more than X game plays, more than X consecutive game plays, or more than X game plays within Z units of time;

(ii) player attempts to select a number of paylines for which the player does not qualify due to insufficient funds for more than X game plays, more than X consecutive game plays, or more than X game plays within Z units of time;

(iii) player attempts to deal a new initial hand of cards prior to a previously dealt hand being resolved for more than X game plays, more than X consecutive game plays, or more than X game plays within Z units of time;

(iv) player attempts to direct a gaming device to perform an action or select a feature that the player should realize is currently unavailable to the player for more than X game plays, more than X consecutive game plays or more than X game plays within Z units of time.

In some embodiments, step 810 (determining, based on an input provided by the player to a gaming device, whether the player qualifies as a problem gambler) may include retrieving data associated with the player from a memory (e.g., a memory of a gaming device, a memory of a controller 105A or a controller 105B, or another device). For example, actions of the player during previous gambling sessions may be retrieved. In another example, a player's status as a problem gambler may be retrieved from a player database. In yet another example, a player's problem gambler score (described in more detail below with respect to FIG. 10) may be retrieved. In one embodiment, it may simply be determined whether (e.g., based on a player identifier provided by the player in step 705), the player is associated with a problem gambler status and/or a problem gambler score that indicates an event should be dispatched with respect to the player.

It should be noted that, in some embodiments, a player identifier of the player providing the input in step 805 may be known or determinable. For example, the player may have inserted a player tracking card into a player tracking device of the gaming device, the player tracking card having stored thereon a unique player identifier. In such circumstances, additional data associated with the player may be retrieved based on the player identifier. In other embodiments, a player may not have provided a player identifier. However, in such latter embodiments it may still be possible to associated the player with data previously obtained and stored with respect to the player. For example, as described above, in some embodiments an image of a player may be captured and data about the player's actions and/or behavior may be associated with the image. Thus, the image may serve as a player identifier. Thus, if an input from a player is determined in step 805, an image of the player may be captured and compared (e.g., via software known in the art for comparing images to find matching images) to previously captured and stored images of players. If there is a match of the currently captured image with an image previously captured, it may be determined that any data associated with the previously captured image applies to the current player.

In some embodiments, steps 805 and 810 may be combined. For example, a device (e.g., a gaming device 110A or a peripheral device 130B) may be programmed to detect certain inputs that are considered to be indications of a problem gambler (e.g., attempting to start the reels again before the reels stopped spinning). If such an input is detected, the detection of that input may be a determination that the player qualifies as a problem gambler or potential problem gambler.

In some embodiments, the input determined in step 805 may be inconclusive. In other words, the input may not provide sufficient information to determine whether the player qualifies as a problem gambler. In such an event, an indication of the input may be stored for further analysis once additional inputs are provided by the player or additional data is obtained about the player. In some embodiments, the player may be classified or associated with a status of "potential problem gambler" or the like. In some embodiments, a casino employee may be dispatched to observe the player in order to conclusively determine whether the player qualifies as a problem gambler based on the input. For example, if the input determined in step 805 is that the player has repeatedly hit or struck the gaming device, this alone may be insufficient to conclude that the player qualifies as a problem gambler. Accordingly, a casino employee may be dispatched to observe the player. For example, the casino employee may observe that the player is simply a rambunctious, slightly drunk young man gambling with his buddies and striking the gaming device to punctuate his conversation with his buddies. In some embodiments in which a casino employee is dispatched to obtain additional information to determine whether a player is a problem gambler, the casino employee may provide an indication of such further information to the device performing the determination of whether the player is a problem gambler. For example, the casino employee may enter such an indication to a casino personnel device, which casino personnel device may transmit the indication over a network to another device (e.g., a gaming device or controller). In some embodiments, a camera (e.g., security camera) may be directed to focus on a player (e.g., in addition to or in lieu of dispatching a casino employee to observe the player) to determine whether the player is a problem gambler. In some embodiments, an operator of a camera (e.g., a security employee viewing images of security cameras in a casino) may be prompted to focus a security camera on the player and observe the player. The operator of the camera may then provide an indication of whether the player qualifies as a problem gambler.

In some embodiments, if additional information needs to be obtained before a determination can be made in step 810, an action may be taken or caused within a predetermined period of time of the input having been received in step 805 in order to obtain the information in a timely manner. For example, the camera may be focused and/or a casino employee dispatched within one minute of the input being received in step 805.

In some embodiments (e.g., in embodiments in which a casino employee is dispatched to observe a player or a camera is directed to focus on a player), it may be desirable to determine that the player playing the subject gaming device at the time the casino employee observes the player and/or at the time the camera focuses on the player is the same player who provided the input determined in step 805 (i.e., to minimize the possibility of erroneously identifying a player as a problem gambler). Thus, for example, it may be determined that the player tracking card that was inserted in the subject gaming device at the time the input was determined has not been removed from the gaming device from the time of the input until the time the casino employee observes the player or the camera focuses on the player. In another example, security camera footage may be consulted to verify that another player has not replaced the player who provided the input determined in step 805. In yet another example, a weight or pressure sensor in a seat associated with the subject gaming device may be used to verify that the player who provided the input determined in step 805 has not since left the seat and been replaced by another player.

As described above, it should be noted that different steps of process 800 or any process described herein, may be performed by different devices. For example, step 805 may be performed by a gaming device 110A, a gaming device 1106 or peripheral device 130B, which device may transmit an indication of the input to another device, such as a controller 100A, controller 1006 or peripheral device server 135B. This other device may then perform the step 810.

If it is determined, in step 810, that the player qualifies as a problem gambler, an appropriate event is caused to be dispatched in step 815. Otherwise, the process 800 returns to step 805 and awaits another input to the gaming device.

In one embodiment, step 815 may comprise transmitting an indication to another device (e.g., a gaming device may transmit the indication to a server device) that it has been determined, based on the input received in step 805, that a player qualifies as a problem gambler. The other device can then determine an event to dispatch and dispatch the event. In other embodiments, step 815 may comprise directly determining an event to dispatch and dispatching the event.

In some embodiments, there may be different levels (e.g., intrusiveness or aggressiveness levels) of events that may be dispatched. Thus, determining an event to dispatch may first comprise determining an event level.

For example, some events may be considered minimally intrusive to the player or minimally aggressive with respect to curbing the player's inappropriate gambling behavior. Examples of such minimally intrusive or minimally aggressive events include, but are not limited to: (i) dispatching a casino employee to offer a gambler a ticket to a buffet; (ii) dispatching a casino employee to engage the player in conversation not related to the player's problem gambler status; (iii) outputting an offer to the player for an event, buffet, promotion, etc. intended to distract the player from his gambling and/or to entice the player to leave the gaming device to perform another activity; and (iii) directing the gaming device to enter an extended bonus round. Such minimally intrusive or minimally aggressive events are referred to herein as Level I events. Examples of more intrusive or more aggressive events that may be dispatched include, but are not limited to (i) dispatching an employee to approach the player and engage the player in conversation related to the player's gambling behavior (e.g., to verify or further determine whether the player is a problem gambler); (ii) outputting a questionnaire to the player, the questionnaire targeted at aiding the player in identifying himself as a problem gambler; (iii) outputting, or having a casino employee provide, information to the player about where to seek help for problem gambling activities; and/or (iv) interrupting play of the gaming device such that it appears to be a technical problem with the gaming device. Such more intrusive or more aggressive events are referred to herein as Level II events. Examples of even more intrusive or even more aggressive events that may be dispatched include, but are not limited to: (i) dispatching an employee to direct the player to stop playing the gaming device; (ii) interrupting play of the gaming device in a manner that indicates to the player that play has been interrupted due to the player's inappropriate gambling behavior (e.g., a message may be output to the player upon interruption of play, the message informing the player why he play has been interrupted); (iii) disqualifying the player from future wagering on certain games (e.g., games with a high volatility) or certain gaming devices; and/or (iv) placing limitations on the player's ability to place wagers (e.g., wagers over a certain magnitude will not be accepted from the player and/or the player will not be allowed to wager more than $X per day or other unit of time). Such even more intrusive or aggressive events are referred to herein as Level III events.

Accordingly, in some embodiments, different levels of events may correspond to different levels or statuses of a problem gambler or problem gambler scores. For example, in one embodiment a status of a potential problem gambler status or low-level problem gambler status may correspond to Level I events. A potential problem gambler status or a low-level problem gambler status may correspond, for example, to a player who has exhibited some inappropriate gambling behavior but who may not necessarily have a severe gambling problem. In another example, a problem gambler status, a likely problem gambler status or a mid-level problem gambler status may correspond to Level II events. A problem gambler status, a likely problem gambler status, or a mid-level problem gambler status may correspond, for example, to a player who has exhibited more than a few or occasional inappropriate gambling behaviors, habits or actions but does not appear to have a severe gambling problem. An extreme problem gambler status or high-level problem gambler status may correspond to Level III events. An extreme or high-level problem gambler status may correspond, for example, to a gambler who has exhibited a multitude of inappropriate gambling behavior or inappropriate gambling behavior that is considered to be extreme and perhaps even dangerous to the player's lifestyle.

In one embodiment, step 810 (or an additional or different step of process 800) may further include determining a level of problem gambler or problem gambler status for a player (based on the input received in step 805 and, perhaps, additional data associated with the player).

In some embodiments, step 815 (or another or different step of process 800) may include determining the level of event to be dispatched. As described above, in some embodiments the level of event may be determined based on the status or level of problem gambler that the player is considered to be. For example, if the player is a low-level problem gambler or only a potential problem gambler, only a Level I event may be dispatched in step 815.

In some embodiments, step 815 (or another step of process 800) may include determining the particular event to be dispatched. In other embodiments, the particular event to be dispatched may be determined by another device if step 815 comprises transmitting an indication to the other device, the indication causing the other device to dispatch an event.

Determining an event for dispatch may involve, for example, determining one or more of (i) resources available for dispatching the event (e.g., is a casino employee available); (ii) previous events dispatched with respect to the player (e.g., based on data associated with the player, such as in a problem gambler database); and (iii) success of previous events dispatched (e.g., with respect to the current player or to players in general). For example, with respect to factor (iii), if outputting an offer for a free buffet meal is found to be unsuccessful in curbing the player's inappropriate gambling behavior, such an event may not be dispatched or dispatched only in limited circumstances.

In some embodiments, determining an event to dispatch may comprise accessing an available event types database 340 to determine, based on an output rule, what type of event to dispatch. For example, if the available event types database 700 is being utilized and the output rules are based on problem gambler scores, a problem gambler score may first be determined for the player in question and an event type selected based on the problem gambler score.

Once an event type is determined, a particular event instance may be dispatched and a record created in a dispatched events database 335 to track the event.

Dispatching an event may comprise, for example, outputting a message to a player of a gaming device (e.g., via a display device of a gaming device being played by a player and/or a display device of a peripheral device), outputting an instruction to a casino employee to approach the player in question (e.g., the instructions may include the location of the player, an image of the player, a description of how to approach the player or what to say to the player, etc.), and/or instructing the gaming device being played by the player to perform an action (e.g., interrupt game play, not accept a wager, etc.). For example, an instruction may be output to a casino employee via a casino personnel device.

In some embodiments, feedback regarding a dispatched event may be received. Receiving such feedback may be a part of process 800. In other embodiments, awaiting, receiving and storing such feedback may be another subroutine. For example, once an event is dispatched, a player's response to the event may be determined and stored. For example, a casino employee dispatched to approach the player may be prompted to enter a description or other indication of the player's behavior or response to the casino employee. The casino employee may enter such a response, for example, via a casino personnel device. In another example in which a questionnaire is output to the player, an indication of whether the player answered the questionnaire and/or the player's answers may be stored. In yet another example, if a player approaches a casino employee to complain or otherwise comment on an event, an indication of the player's response may be entered by the approached casino employee.

Figure 9:
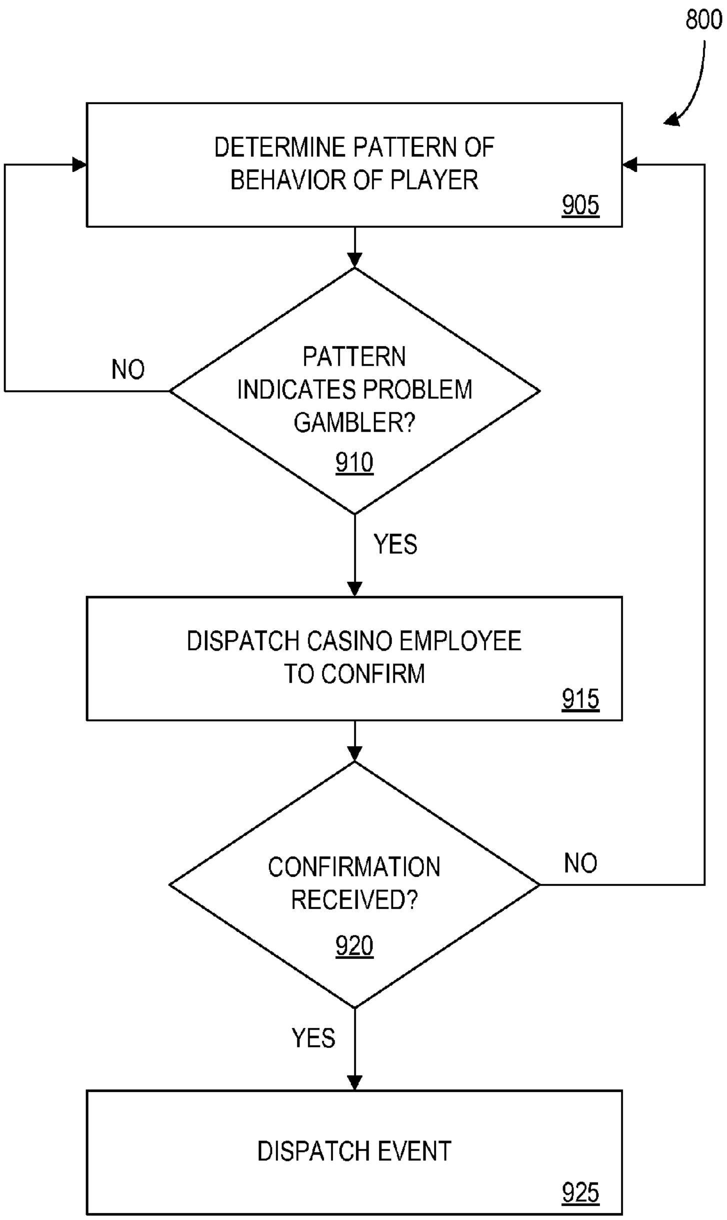
FIG. 9 is flowchart illustrating a process in accordance with one or more embodiments.

Referring now to FIG. 9, illustrated therein is a process 900 consistent with one or more embodiments described herein. The process 900 is similar to the process 800. Some differences among the processes are: (i) in process 900 a pattern of behavior for a player is tracked versus a player input; (ii) the particular event dispatched in process 900 is a dispatch of a casino employee to approach the player; and (iii) a confirmation from the casino employee is received after the employee is dispatched. These differences are described in more detail below.

In step 900, a pattern of behavior of a player is determined. A pattern of behavior may comprise, for example, (i) a wagering pattern; (ii) a cash-out pattern; (iii) a strategy pattern (e.g., a video poker strategy pattern); and/or (iii) a pattern of obtaining funds. Applicants have recognized that some patterns of behavior may indicate that a player is a problem gambler.

For example, a pattern of wagering that may be of concern is one or more of the following:

(i) a player wins a jackpot and immediately keeps playing as fast as possible to wager with the win, without pausing at all to savor the big win or consider whether to cash out (i.e., no pause between a big win and the next game play initiation);

(ii) on a high maximum wager gaming device, the player puts in 40 quarters (enough for one game play) and bets it all on one game play, then repeats the action for the next game play; and (iii) a player persistently bets too high a proportion of coin in: for example, the player puts in $20, bets $6 on a first game play, bets $6 on a second game play; bets $6 on a third game play, bets $2 on the last game play, then puts in another $20 and repeats the betting pattern.

In another example, a pattern of cashing out that may be of concern is one or more of the following:

(i) a player puts in $20, loses the entire $20, puts in another $20, loses entire $20, moves to another gaming device and repeats the pattern; and/or (ii) the above player additionally moves from one gaming device to another between putting in the additional $20 of each cycle of pattern.

In another example, a strategy pattern that may be of concern is if, in a video poker game, a player continuously applies a "desperation strategy" (e.g., of only going for the Royal Flush, no matter what cards are dealt). For example, a player may throw away a high expected value hand (e.g., three of a kind) in order to attempt to get a Royal Flush, on a consistent basis.

In another example, a strategy of obtaining funds that may be of concern is if a player obtains a high line of credit from the casino (e.g., $500) and immediately loses it all in five minutes.

Many other patterns of behavior may be recognized and watched for among players. For example, consistently attempting to actuate the reel starting mechanism prior to the reels stopping spinning from a previously initiated game play, as described above, may be a pattern of behavior that is watched for as a sign of a problem gambler.

Referring now to Step 910, it is determined whether the pattern of behavior determined in step 905 indicates a problem gambler. Such a determination may be performed in a similar manner to that described with respect to step 805 (FIG. 8). For example, a score may be determined for the pattern of behavior. In another example, it may be a binary determination. If the pattern of behavior is one that is a pattern of concern (e.g., a pattern a device is programmed to detect), simply detecting that a player is exhibiting the pattern of behavior may result in a determination that the player is a problem gambler. If it is determined that the pattern does not indicate a problem gambler, the process 900 returns to step 905. Otherwise, the process 900 continues to step 910.

In step 910, a casino employee is dispatched to confirm that the player is a problem gambler. For example, as described with respect to FIG. 8, it may be necessary to confirm that the player is a problem gambler by having a casino employee observe the player. Accordingly, a casino employee may be instructed (e.g., via a casino personnel device) to stand near the player for a period of time and observe the player. For example, sometimes casino personnel may be trained or knowledgeable that a player's mannerisms and/or facial expressions (or lack thereof) may be an indication of whether the player is a problem gambler. In another embodiment, a camera may be used to observe a player in order to determine the player's mannerisms and/or facial expressions (or lack thereof) to determine or confirm that the player is a problem gambler. In such embodiments, step 915 may comprise directing a camera to focus on the player in question and/or instructing a casino employee to focus a camera on the player in question.

In step 920, it is determined whether the confirmation is received. For example, it may be determined whether the casino employee dispatched in step 915 has provided (e.g., entered into a casino personnel device operable to communicate via a server device via a network) an affirmation that the player appears to be a problem gambler. If such a confirmation is received, the process 900 continues to step 925. If a confirmation is not received, the casino employee may be prompted for the confirmation. If the casino employee indicates that the player does not appear to be a problem gambler, the process 900 returns to step 905.

In step 925, an event is dispatched upon the confirmation being received. Dispatching an event in step 900 may be similar to dispatching an event as described with respect to process 800, and thus need not be repeated in detail. For example, a casino employee (e.g., the same casino employee dispatched in step 915) may be instructed to approach the player and engage the player in conversation. In another example, a message may be output to the player.

It should be noted that any additional processes, steps or sub-routines described with respect to FIG. 8 (e.g., determining a status of a problem gambler, determining a problem gambler score, determining a type of event and/or level of event to dispatch) apply equally to process 900, as appropriate.

Figure 10:
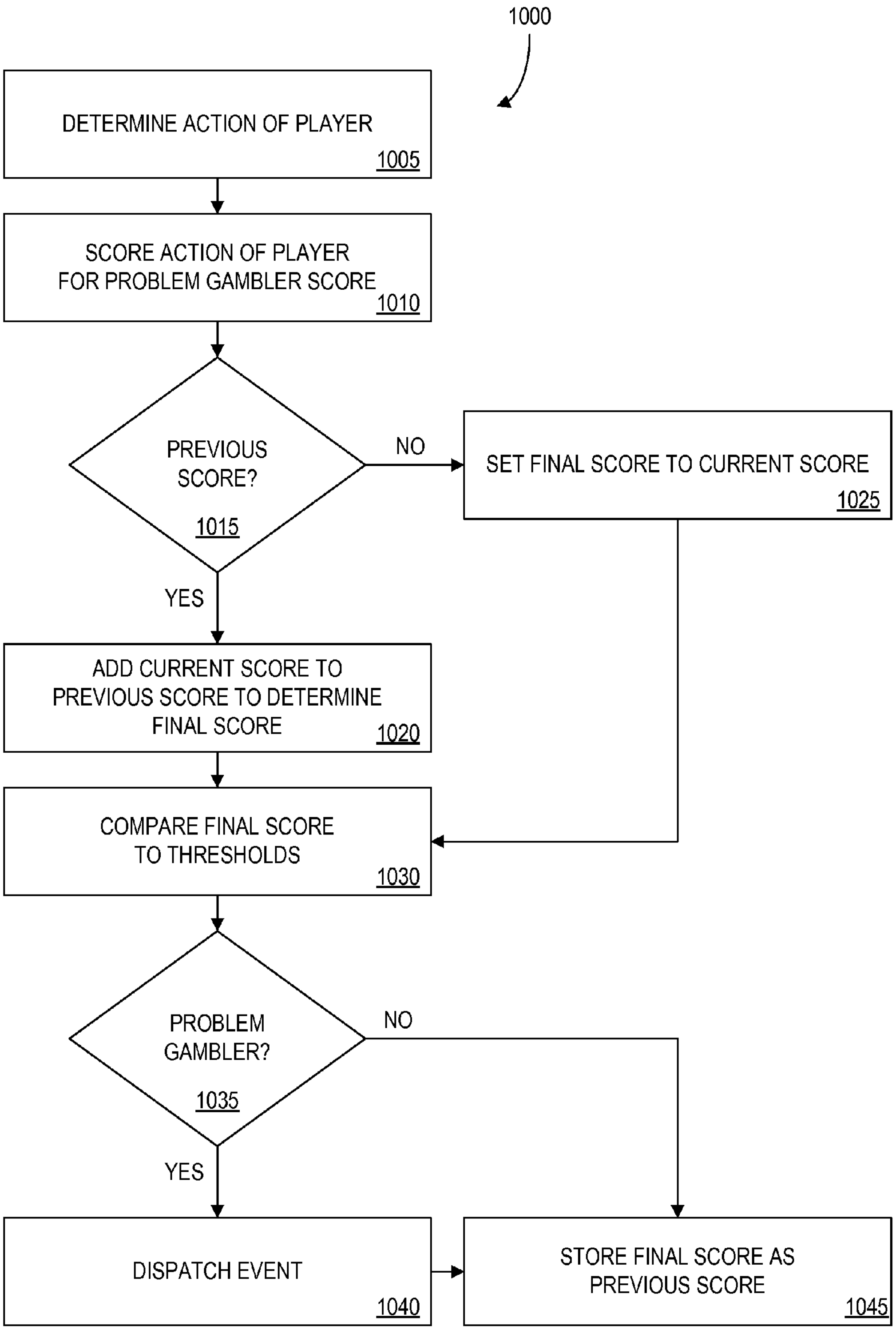
FIG. 10 is a flowchart illustrating a process in accordance with one or more embodiments.

Referring now to FIG. 10, illustrated therein is a process 1000 that is consistent with one or more embodiments described herein. Process 1000 may be characterized as a process of utilizing a problem gambler score to determine whether a player is a problem gambler.

In step 1005, an action of a player is determined. The action of the player may comprise, for example, an input provided by the player to a gaming device and/or a pattern of behavior exhibited by the player.

In step 1010, the action of the player is scored for a problem gambler score. For example, in some embodiments a number of points may correspond to each respective player action that may be an indication of a problem gambler. More points may correspond, for example, to actions that more clearly indicate a problem gambler.

In step 1015, it is determined whether a previous problem gambler score is associated with the player. For example, a player identifier may be determined for the player whose action was determined in step 1005 and the player identifier may be utilized to access the appropriate record in a player database or a problem gambler database that is used to store such a problem gambler score, if any.

If no previous problem gambler score is associated with the player (e.g., the player has not previously performed any actions that would indicate the player is a problem gambler), score determined in step 1010 is set to be the final problem gambler score for the player (step 1025). If, on the other hand, there is a previous score associated with the player, the score determined in step 1010 is added to the previous score o determine a final problem gambler score for the player (step 1020).

In step 1030, the final problem gambler score is compared to ranges or thresholds of problem gambler scores. For example, a table such as the example one provided below may be used in step 1030:

| Problem Gambler Score | Problem Gambler Status |
|---|---|
| 0-100 | Not a problem gambler |
| 101-150 | Potential problem gambler; low-level problem gambler |
| 151-200 | Problem gambler; mid-level problem gambler |
| <200 | Severe problem gambler |

Thus, step 1030 may comprise comparing the final problem gambler score determined in either step 1020 or step 1025 to the ranges stored in such a table. Of course, in a simplified embodiment, there may not be different levels of a problem gambler and a table may not be necessary or desired. For example, a device may be programmed to determine that if a final problem gambler score is greater than X, the player is a problem gambler. Otherwise, the player may be considered to not be a problem gambler.

In step 1035, it is determined whether the player is a problem gambler. For example, the problem gambler status in the table above that corresponds to the final score may be determined. If the player is not a problem gambler, the final problem gambler score is simply stored for future use (step 1045). Otherwise, an event is dispatched (step 1040) and the final problem gambler score is stored. Dispatching an event may comprise any of the methodologies described herein, especially those described with respect to FIG. 8 and FIG. 9.

While various embodiments have been described herein, it should be understood that the scope of the present invention is not limited to the particular embodiments explicitly described. Many other variations and embodiments would be understood by one of ordinary skill in the art upon reading the present description.

What is claimed is:

1. A gaming device for facilitating a wagering game, comprising:
  a display device for displaying game information to a player;
  an input device usable by the player to provide an input to the gaming device;
  a processor operable to facilitate a wagering game; and
  a memory storing a program for directing the processor,
    wherein the processor and the program are operable together to:
      detect a repeated input provided by the player via the input device, wherein the repeated input comprises a repeated attempt by the player to actuate the input device during an inactive state of the input device;
      determine, based on a stored rule which defines a repeated attempt by a player to actuate the input device during an inactive state of the input device as a characteristic of a problem gambler, that the repeated input is an indication that the player may require attention as a problem gambler; and
      transmit a signal to a server device, the signal indicating the repeated input from the player.

2. The gaming device of claim 1, wherein the gaming device comprises a slot machine and the input device comprises a reel starting mechanism, and further
  wherein the processor and the program being operable together to determine that the player has repeatedly attempted to actuate the input device during an inactive state of the input device comprises
    the processor and the program being operable together to determine that the player has repeatedly attempted to actuate the reel starting mechanism at a time when the reels are still spinning from a current game play.

3. The gaming device of claim 1, wherein the gaming device comprises a slot machine and the input device comprises a payline selection mechanism, and further
  wherein the processor and the program being operable together to determine that the player has repeatedly attempted to actuate the input device during an inactive state of the input device comprises
  the processor and the program being operable together to determine that the player has repeatedly attempted to select a payline for which the player is ineligible due to an insufficient credit balance.

4. The gaming device of claim 1, wherein the gaming device comprises a slot machine and the input device comprises a wager amount selection mechanism, and further
  wherein the processor and the program being operable together to determine that the player has repeatedly attempted to actuate the input device during an inactive state of the input device comprises
    the processor and the program being operable together to determine that the player has repeatedly attempted to select a wager amount which the player is ineligible to wager due to an insufficient credit balance.

5. The gaming device of claim 1, wherein the program and the processor are together further operable to perform at least one of the following, based on the determination that the player may require attention as a problem gambler:
  interrupt play of the gaming device by the player; and
  output a message to the player, the message being targeted towards curbing the player's gambling behavior.

6. A gaming system, comprising:
  a gaining device having a display device for displaying game information to a player and an input device operable to receive an input from the player to the gaming device; and
  a server device in communication with the gaming device, wherein
  the gaming device is operable to
    detect that a player has provided a repeated input to the gaming device using the input device, wherein the repeated input comprises a repeated attempt by the player to actuate the input device during an inactive state of the input device; and
    transmit an indication of the repeated input to the server device; and
  further wherein the server device is operable to:
    determine, based on the repeated input and based on a stored rule which defines a repeated attempt by a player to actuate the input device during an inactive state of the input device as a characteristic of a problem gambler, that the player may require attention as a problem gambler; and
    dispatch an event in response to the determination.

7. The system of claim 6, wherein the server device being operable to dispatch an event comprises the server device being operable to transmit an instruction to a casino employee to approach the player.

8. The system of claim 6, wherein the server device being operable to dispatch an event comprises the server device being operable to create a record in a database, the record indicating that the player may require attention as a problem gambler.

9. The system of claim 6, wherein the server device being operable to dispatch an event comprises the server device being operable to determine a score that corresponds to the indication.

10. The system of claim 6, wherein the server device being operable to dispatch an event comprises the server device being operable to direct a video camera to focus on the player.

11. The system of claim 6, wherein the server device being operable to dispatch an event comprises the server device being operable to output a message to the player, the message targeted at curbing the player's gambling behavior.

12. The system of claim 6, wherein the server device being operable to dispatch an event comprises the server device being operable to interrupt play of the gaming device by the player.

13. A server operable to facilitate a wagering establishment, comprising:
  a processor; and
  a memory storing a program for directing the processor,
  wherein the processor and the program are operable together to:
    receive an indication from a gaming device, the indication indicative of a repeated input provided by a player to the gaming device, wherein the repeated input comprises a repeated attempt by the player to actuate feature of the gaining device during an inactive state of the feature;
    determine, based on the indication and based on a stored rule which defines a repeated attempt by a player to actuate the feature during an inactive state of the feature as a characteristic of a problem gambler, that the player may require attention as a problem gambler; and
    dispatch an event in response to the determination.

14. The server of claim 13, wherein dispatching the event comprises at least one of:

transmitting an instruction to a casino employee to approach the player;

creating a record in a database, the record storing an indication that the player may be a problem gambler;

scoring the indication;

directing a video camera to focus on the player;

outputting a message to the player, the message targeted at curbing the gambling behavior of the player; and interrupting play of the gaming device by the player.

* * * * *